United States Patent
Thubert et al.

(10) Patent No.: US 11,516,120 B2
(45) Date of Patent: *Nov. 29, 2022

(54) DISTANCE VECTOR NEGATIVE SOUTHBOUND TOPOLOGY INFORMATION FOR ROUTING IN FAT TREES (RIFT) ROUTE

(71) Applicant: Cisco Technology, Inc., San Jose, CA (US)

(72) Inventors: Pascal Thubert, La Colle sur Loup (FR); Nagendra Kumar Nainar, Morrisville, NC (US); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/101,579

(22) Filed: Nov. 23, 2020

(65) Prior Publication Data

US 2021/0075718 A1   Mar. 11, 2021

Related U.S. Application Data

(63) Continuation of application No. 16/202,780, filed on Nov. 28, 2018, now Pat. No. 10,848,417.

(60) Provisional application No. 62/674,150, filed on May 21, 2018.

(51) Int. Cl.
| | | |
|---|---|---|
| H04L 45/48 | (2022.01) | |
| H04L 45/12 | (2022.01) | |
| H04L 45/02 | (2022.01) | |
| H04W 40/24 | (2009.01) | |
| H04L 12/44 | (2006.01) | |

(52) U.S. Cl.
CPC .............. *H04L 45/48* (2013.01); *H04L 12/44* (2013.01); *H04L 45/02* (2013.01); *H04L 45/123* (2013.01); *H04W 40/248* (2013.01)

(58) Field of Classification Search
None
See application file for complete search history.

(56) References Cited

U.S. PATENT DOCUMENTS

| | | | |
|---|---|---|---|
| 9,007,895 | B2 | 4/2015 | Schlansker et al. |
| 9,294,385 | B2 | 3/2016 | Gusat et al. |
| 10,848,417 | B2 | 11/2020 | Thubert et al. |
| 2012/0039161 | A1 | 2/2012 | Allan et al. |
| 2012/0281520 | A1 | 11/2012 | Ansari et al. |
| 2016/0269188 | A1 | 11/2016 | Thubert et al. |
| 2016/0352633 | A1* | 12/2016 | Kapadia ................. H04L 41/04 |
| 2018/0183706 | A1* | 6/2018 | Przygienda ........... H04L 45/025 |
| 2018/0343137 | A1 | 11/2018 | Van De Velde et al. |

* cited by examiner

*Primary Examiner* — Christine T Duong
(74) *Attorney, Agent, or Firm* — Merchant & Gould P.C.

(57) ABSTRACT

In one embodiment, a method is performed. A spine node in communication with a network may determine a subtree of a shadow cone of the spine node. The subtree may comprise a plurality of nodes and a plurality of links connecting pairs of the nodes. The spine node may determine a disaggregated route to a first leaf node to which a disaggregated prefix may be attached. The disaggregated route may be propagated to the plurality of the nodes of the subtree.

15 Claims, 29 Drawing Sheets

DISTANCE VECTOR NEGATIVE SOUTHBOUND TOPOLOGY INFORMATION FOR ROUTING IN FAT TREES (RIFT) ROUTE

CROSS-REFERENCE TO RELATED APPLICATIONS

This application is a Continuation of U.S. patent application Ser. No. 16/202,780, filed on Nov. 28, 2018, and claims priority to U.S. Provisional Patent No. 62/674,150, filed on May 21, 2018, the complete disclosures of which are hereby incorporated by reference.

TECHNICAL FIELD

The present disclosure generally relates to networking.

BACKGROUND

Routing in Fat Trees (RIFT) is an Internet Engineering Task Force (IETF) working group whose aim is to design a routing protocol specifically optimized for cloud fabric underlays.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
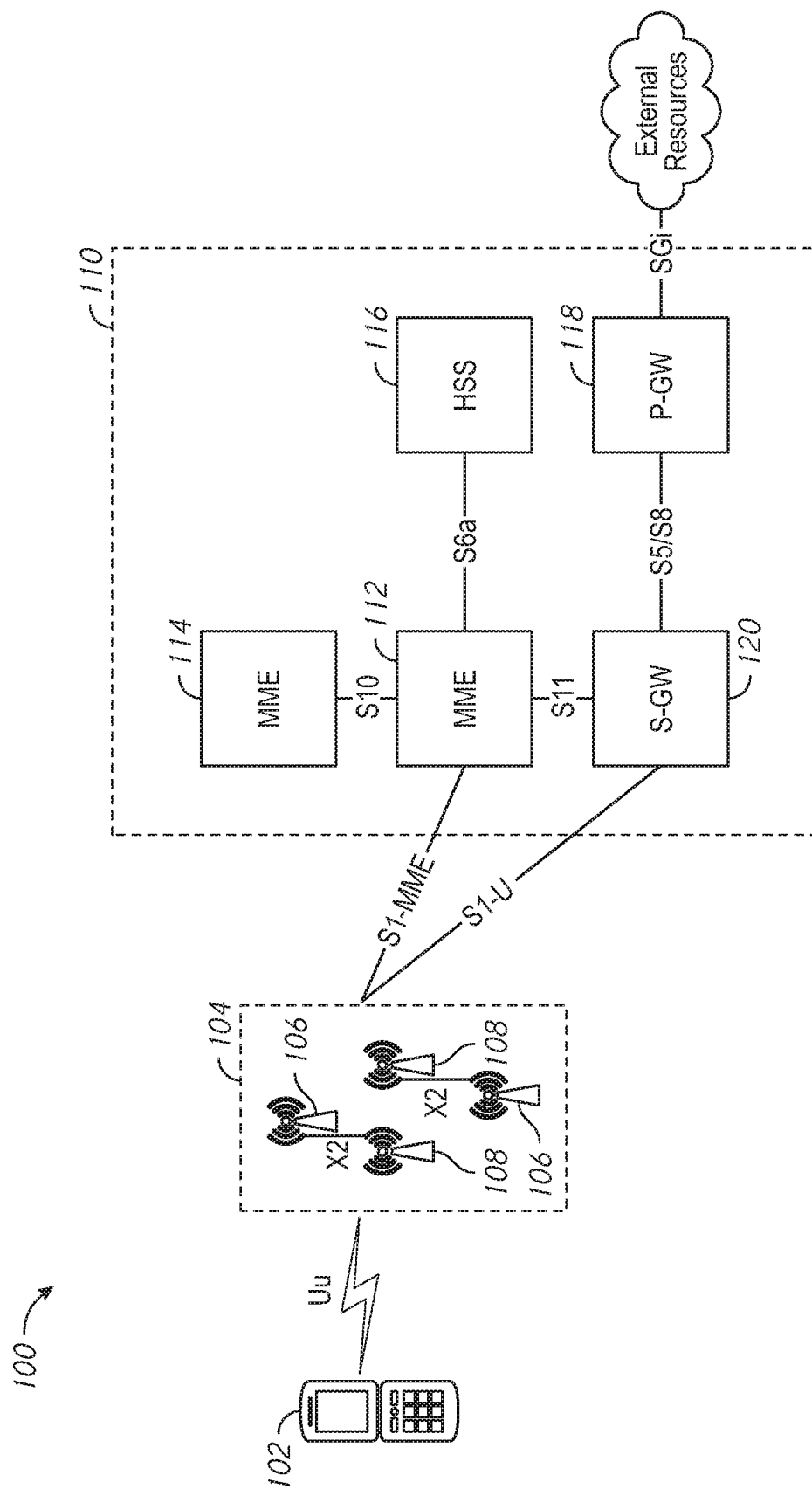
FIG. 1 is a diagram that illustrates an example long term evolution (LTE) network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for reducing or minimizing a control path for disaggregation in RIFT to improve affordability. Transitive disaggregation may be addressed. In one embodiment, a method is performed. A spine node in communication with a network may determine a subtree of a shadow cone of the spine node. The subtree may comprise a plurality of nodes and a plurality of links connecting pairs of the nodes. The spine node may determine a disaggregated route to a first leaf node to which a disaggregated prefix may be attached. The disaggregated route may be propagated to the plurality of nodes of the subtree.

Example Embodiments

FIG. 1 illustrates an example long term evolution (LTE) network 100. The LTE network 100 may include a user equipment (UE) device 102, such as a mobile telephone. It will be appreciated that the LTE network 100 typically includes multiple UE devices 102; however, one UE device 102 is depicted for purposes of simplicity.

The LTE network 100 may include an access network, e.g., an evolved universal mobile telecommunications system (UMTS) terrestrial radio access network (E-UTRAN) 104. The UE device 102 may communicate with the E-UTRAN 104 via a Uu interface. The E-UTRAN 104 may include one or more eNodeB (eNB) entities 106. The E-UTRAN 104 may include one or more next generation NodeB (gNB) devices 108. The one or more gNB entities 108 may be in communication with the one or more eNB entities 106 via one or more X2 interfaces.

The LTE network 100 may include a core network, e.g., an evolved packet core (EPC) network 110. The E-UTRAN 104 may communicate with the EPC network 110 using an S1 interface, which may include an S1-MME interface and/or an S1-U interface. The EPC network 110 may include one or more mobility management entities (MMEs) 112, 114. The MMEs 112, 114 may communicate with the E-UTRAN 104 via an S1-MME interface and may communicate with one another via an S10 interface. The MMEs 112, 114 may control high-level operation of the EPC network 110 using signaling messages and a home subscriber server (HSS) 116, with which they may communicate via an S6a interface. The HSS 116 may serve as a central database that may include information regarding the network operator's subscribers.

The EPC network 110 may also include a packet data network (PDN) gateway (PGW) 118. The PGW 118 may communicate with external resources, e.g., servers and/or packet data networks, via an SGi interface. A serving gateway (SGW) 120 may communicate with the MMEs 112, 114 using an S11 interface and with the E-UTRAN 104 using the S1-U interface. The SGW 120 may forward data between a base station and the PGW 118. The SGW 120 and the PGW 118 may communicate with one another via an S5/S8 interface.

When the UE device 102 establishes a connection with the LTE network 100, an eNB entity 106 may select a MME, e.g., the MME 112 or the MME 114, with which the UE device 102 may register. If the UE device 102 has fifth generation (5G) capability, it may publish its 5G capability in non-access stratum (NAS) messaging. An MME that has 5G non-standalone architecture (NSA) capability may extract the UE device capability information from the NAS messaging and may receive 5G subscription information for the subscriber from the HSS 116. A 5G-capable MME may assist in establishing 5G sessions in the LTE network 100.

Figure 2:
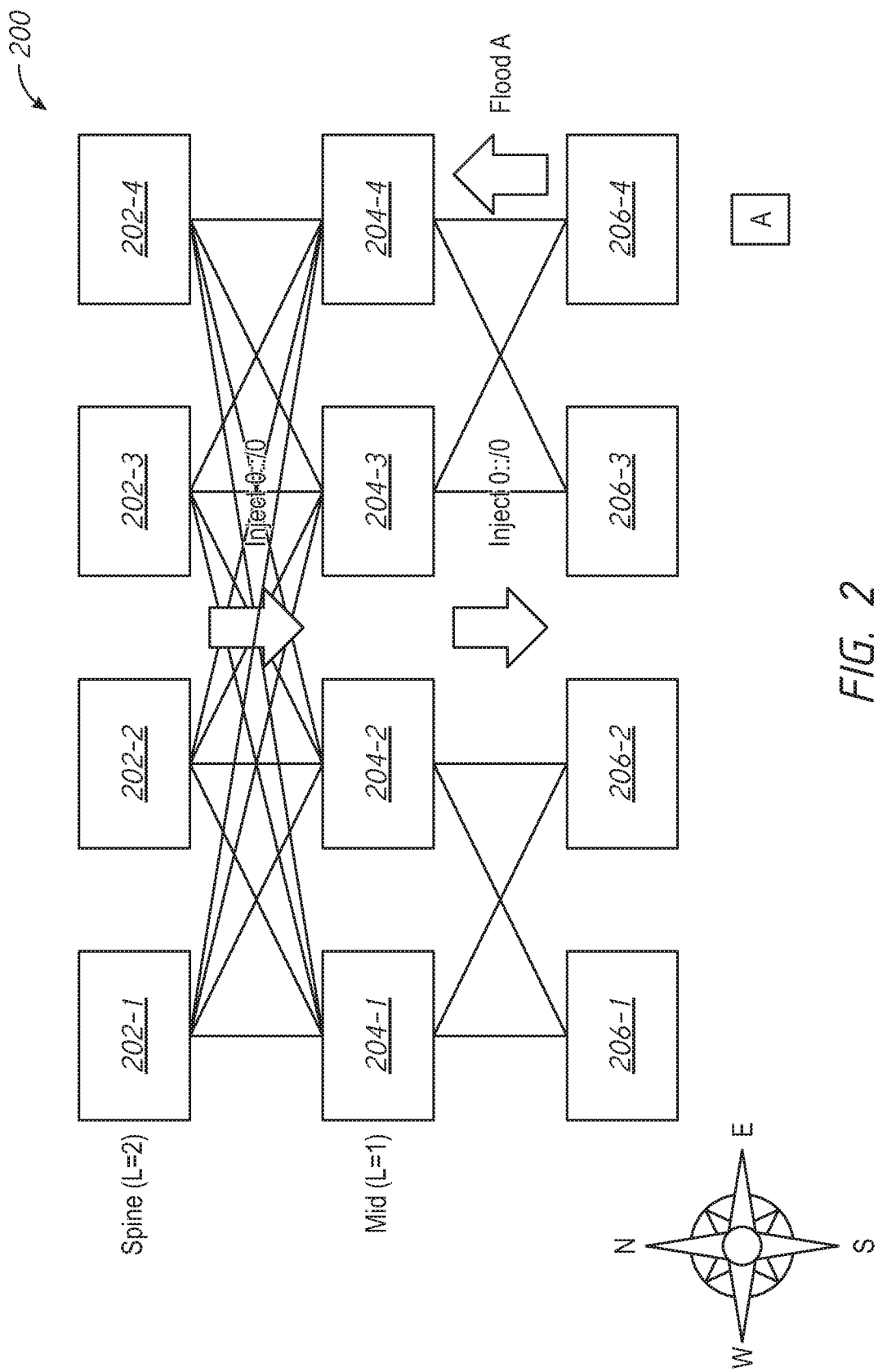
FIG. 2 is an example node graph that illustrates an example network.

FIG. 2 is an example node graph that illustrates an example network 200. The network 200 may include spine nodes 202-1, 202-2, 202-3, and 202-4, which may be collectively referred to as spine nodes 202. The network 200 may include mid-level nodes 204-1, 204-2, 204-3, and 204-4, which may be collectively referred to as mid-level nodes 204. The network 200 may include leaf nodes 206-1, 206-2, 206-3, and 206-4, which may be collectively referred to as leaf nodes 206. The network 200 may have a topology that may be implemented as a fat tree that may be substantially fully meshed between the spine nodes 202 and the mid-level nodes 204. The network 200 may be partitioned in pods. For example, to limit the number of ports per leaf switch, leaves may be grouped in pods.

In order to speed up convergence in a control plane, routing in fat trees (RIFT) may operate in an anisotropic fashion. For example, nodes may flood down south (e.g., from the spine nodes 202 toward the leaf nodes 206) the advertisement of a default route in a distance vector (DV) fashion. The default route may be recomputed and/or reissued at each hop. Packets may be forwarded northward, e.g., by default.

In a network, flooding may involve the forwarding by a router of a packet from a node to every other node attached to the router except the node from which the packet arrived. Flooding may facilitate distributing routing information updates quickly to every node in a large network. Flooding may be used in multicast packet, e.g., from one source node to many specific nodes in a real or virtual network.

As another example, nodes may flood up north (e.g., from the leaf nodes 206 toward the spine nodes 202) the advertisement of more specific routes that may be reachable via a particular node in a link state (LS) fashion. Topological information may be flooded. Reachability information may be flooded, for example, after the topological information is flooded. Packets that may match more specific routes (e.g., as compared with a default route) may be forwarded southward.

In some embodiments, a default route may be designated. For example, a distance vector (DV) operation may advertise a default route. In some scenarios, a spine node, e.g., the spine node 202-1, may not be able to see a particular leaf node, such as the leaf node 206-4. The spine node 202-1 may not be able to reach a prefix that is attached to a leaf node that it cannot see. An exception to the default route may be installed or configured in the network so that packets destined for the prefix are not routed to a dead end. The process of sending a southbound route injection to cover the reachability exception may be known as a route disaggregation. For example, a route disaggregation may be a negative disaggregation that may specify that all spine nodes may be used as default routers to reach all prefixes, with the exception that the spine node 202-1 may not be used as a router to reach a particular prefix, e.g., a prefix that is attached to a leaf node that the spine node 202-1 cannot see. A negative disaggregation may specify an exception to a default route advertised by one or more northbound nodes. A negative disaggregation may be sent from spine nodes that may not be able to reach the particular prefix. A negative disaggregation may be flooded transitively, e.g., children nodes of a node may repeat a node advertisement south.

A route disaggregation may be a positive disaggregation that may specify spine nodes that may be used as a default router to reach a prefix. A positive disaggregation may be sent southward from one or more (e.g., most or all) spine nodes that may still reach the leaf node that is attached to the prefix. For example, a positive disaggregation may be flooded one hop to nodes south of the spine nodes. In some scenarios, a positive disaggregation may be flooded transitively so that it reaches the leaf nodes.

Figure 3:
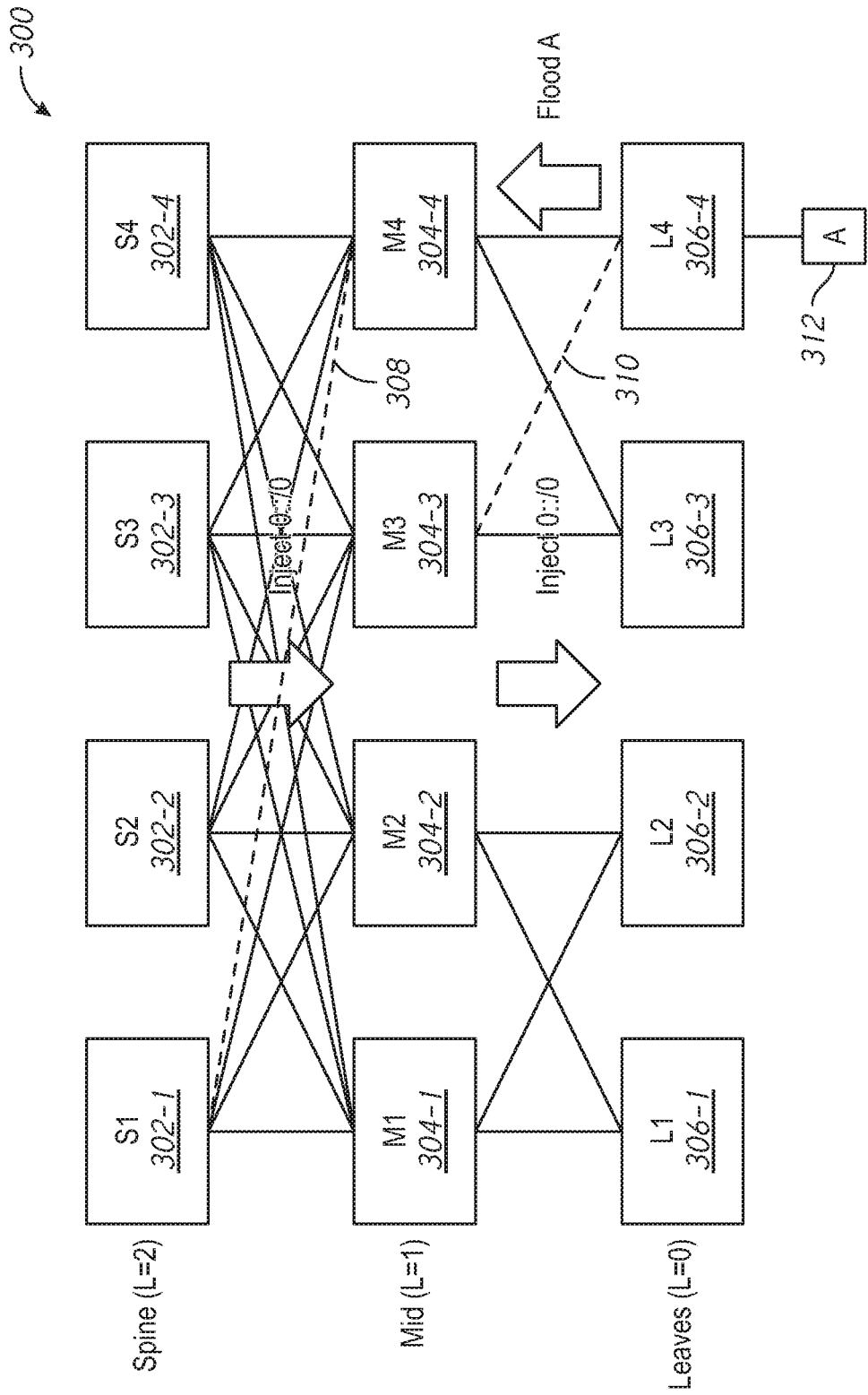
FIG. 3 is an example node graph that illustrates an example network with route disaggregation.

FIG. 3 is an example node graph that illustrates an example network 300 with route disaggregation. The network 300 may include spine nodes 302-1, 302-2, 302-3, and 302-4, which may be collectively referred to as spine nodes 302. The network 300 may include mid-level nodes 304-1, 304-2, 304-3, and 304-4, which may be collectively referred to as mid-level nodes 304. The network 300 may include leaf nodes 306-1, 306-2, 306-3, and 306-4, which may be collectively referred to as leaf nodes 306. The network 300 may have a topology that may be implemented as a fat tree that may be substantially fully meshed between the spine nodes 302 and the mid-level nodes 304. The network 300 may be partitioned in pods.

The network 300 may have one or more broken links, e.g., links 308 and 310 indicated by dashed lines in FIG. 3. Due to these broken links, one or more spine nodes 302 may be isolated from one or more leaf nodes 306. For example, the spine node 302-1 may be isolated from the leaf node 306-4. As a result, floodings from and about the leaf node 306-4 may not reach the spine node 302-1.

A prefix 312 may be attached to the leaf node 306-4. If floodings from and about the leaf node 306-4 may not reach the spine node 302-1, then the spine node 302-1 may not be able to forward packets to the prefix 312.

In some embodiments, route disaggregation may be used to transmit exceptions to the default route from RIFT nodes, e.g., the spine nodes 302, southward. An example exception may be that all of the mid-level nodes 304 may use all of the spine nodes 302 as default routers, with the exception of the spine router 302-1 when attempting to reach the prefix 312.

Figure 4:
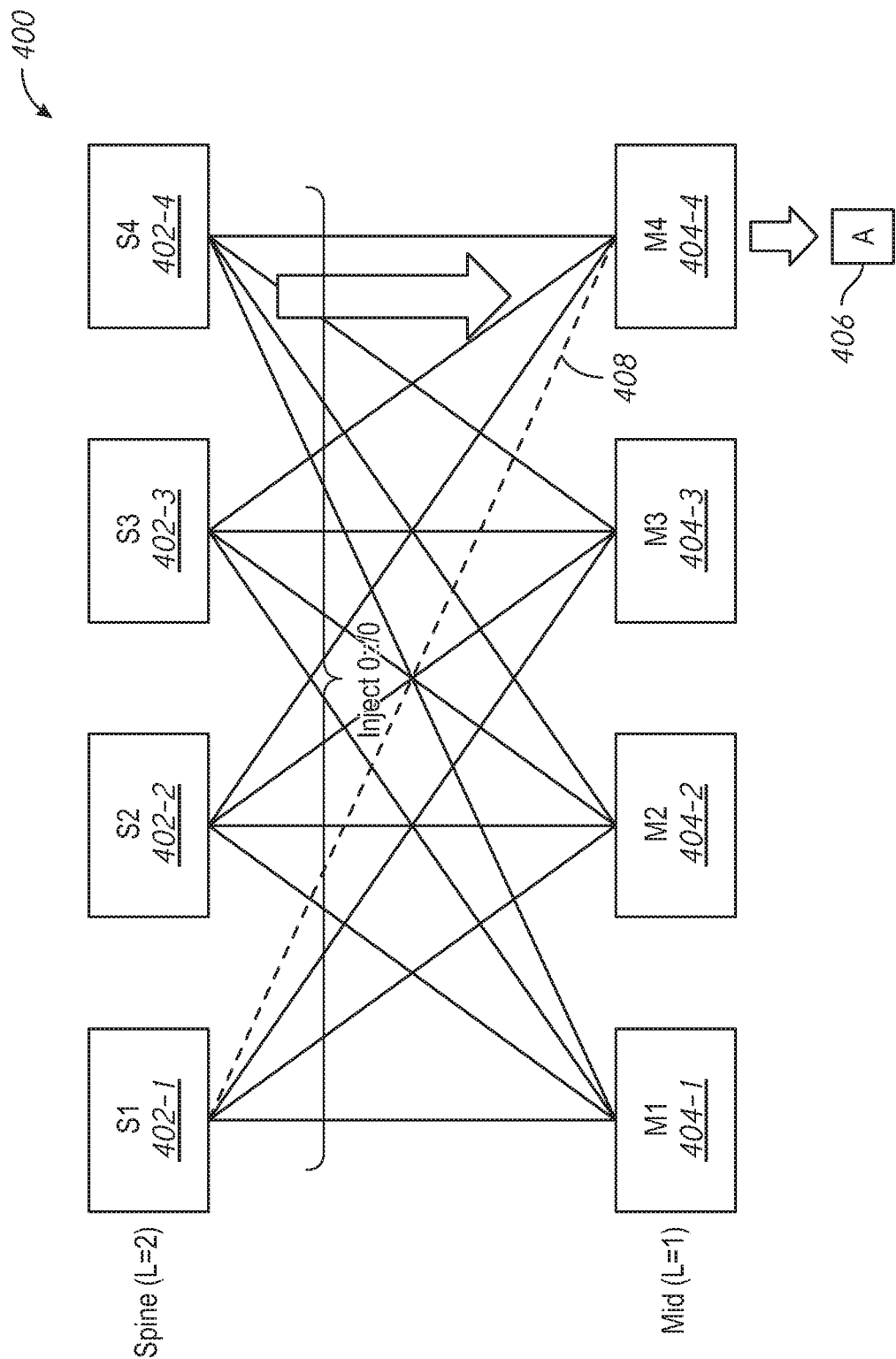
FIG. 4 is an example node graph that illustrates a portion of an example network with route disaggregation.

FIG. 4 is an example node graph that illustrates a portion of an example network 400 with route disaggregation. The network 400 may include spine nodes 402-1, 402-2, 402-3, and 402-4, which may be collectively referred to as spine nodes 402. The network 400 may include mid-level nodes 404-1, 404-2, 404-3, and 404-4, which may be collectively referred to as mid-level nodes 404. The network 400 may include leaf nodes (not shown) that may be arranged similarly to the configuration in FIG. 3. The network 400 may include a prefix 406 that may be attached to the mid-level node 404-4 or to a leaf node (not shown).

In the example network 400, the spine nodes 402-2, 402-3, and 402-4 may be valid default routers. The spine node 402-1 may not be a valid default router. For example, a communication link 408 between the spine node 402-1 and the mid-level node 404-4 may have failed, as shown by the dashed line in FIG. 4. The spine nodes 402-1, 402-2, 402-3, and 402-4 may have advertised the default route. Accordingly, it may be desired to ensure that the mid-level nodes 404-1, 404-2, and 404-3 get all the packets that are destined for the prefix 406.

In some embodiments, some spine nodes 402 and nodes at lower levels, e.g., mid-level nodes 404, may have reachability to one or more prefixes that neighbors at the same level may not be able to reach. These nodes 402, 404 that have reachability to these one or more prefixes may advertise south a more specific route to the one or more prefixes. For example, in the example network 400, if the mid-level node 404-4 has reachability to the prefix 406 and the mid-level nodes 404-1, 404-2, and 404-3 do not have reachability to the prefix 406, the mid-level node 404-4 may advertise a more specific route to the prefix 406.

In some embodiments, route disaggregation may be transitive when children nodes of a node may repeat the more specific node advertisement south. This may occur, for example, when a mid-layer node 404 is unable to reach a spine node 402 that can reach the prefix 406.

A spine node 402 may have a partial view of the network 400, e.g., a spine node 402 may be aware of the existence and/or status of a subset of the nodes of the network 400. A spine node 402 may have a partial view of the network 400, for example, if the network 400 has incomplete interconnectivity at the spine level. A spine node 402 that has a partial view of the network 400 may be unable to determine whether disaggregation is needed. A spine node 402 that has a partial view of the network 400 may be unable to determine whether route disaggregation may be needed and, if so, whether the disaggregation may need to be transitive.

Figure 5:
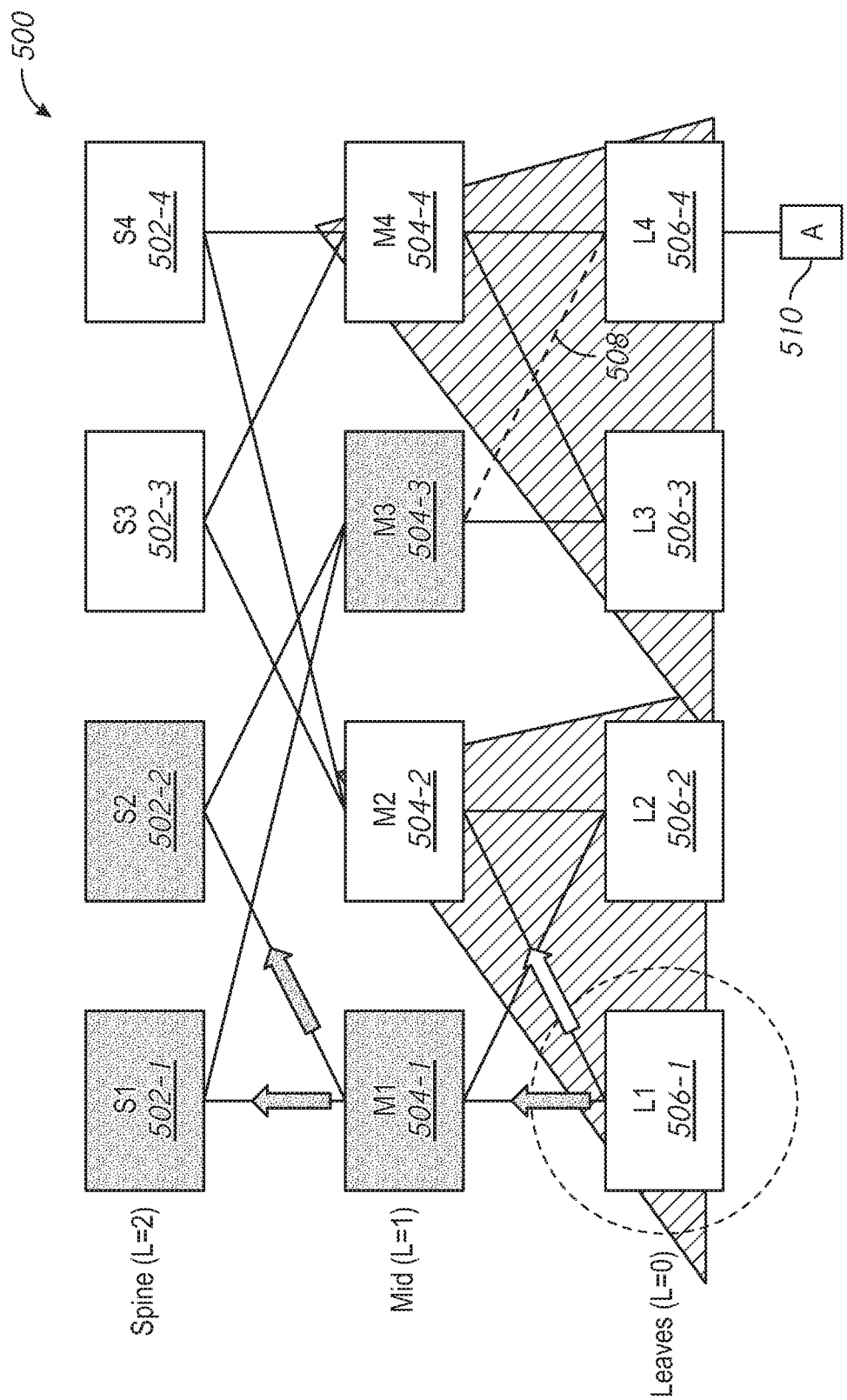
FIG. 5 is an example node graph that illustrates a portion of an example network with route disaggregation.

FIG. 5 is an example node graph that illustrates an example network 500 with route disaggregation. The network 500 may include spine nodes 502-1, 502-2, 502-3, and 502-4, which may be collectively referred to as spine nodes 502. The network 500 may include mid-level nodes 504-1, 504-2, 504-3, and 504-4, which may be collectively referred to as mid-level nodes 504. The network 500 may include leaf nodes 506-1, 506-2, 506-3, and 506-4, which may be collectively referred to as leaf nodes 506. The network 500 may have a topology that may be implemented as a fat tree that may be substantially fully meshed between the spine nodes 502 and the mid-level nodes 504. The network 500 may be partitioned in pods. Shaded triangles on FIG. 5 indicate leaf nodes 506 that are visible by the mid-level nodes 504-2 and 504-4.

In the example network 500, incomplete visibility between nodes may cause issues. For example, a link 508 between the mid-level node 504-3 and the leaf node 506-4 may break. A prefix 510 may be attached to the leaf node 506-4. With the link 508 broken, the spine nodes 502-1 and 502-2 and the mid-level nodes 504-1 and 504-3 may be unable to reach the prefix 510, as indicated by the shaded blocks in FIG. 5. The spine node 502-4 may not know whether the spine nodes 502-1 and 502-2 exist. Even if the spine node 502-4 knows that the spine nodes 502-1 and 502-2 exist, the spine node 502-4 may not know what the mid-level node 504-1 may advertise to the spine nodes 502-1 and 502-2.

Figure 6:
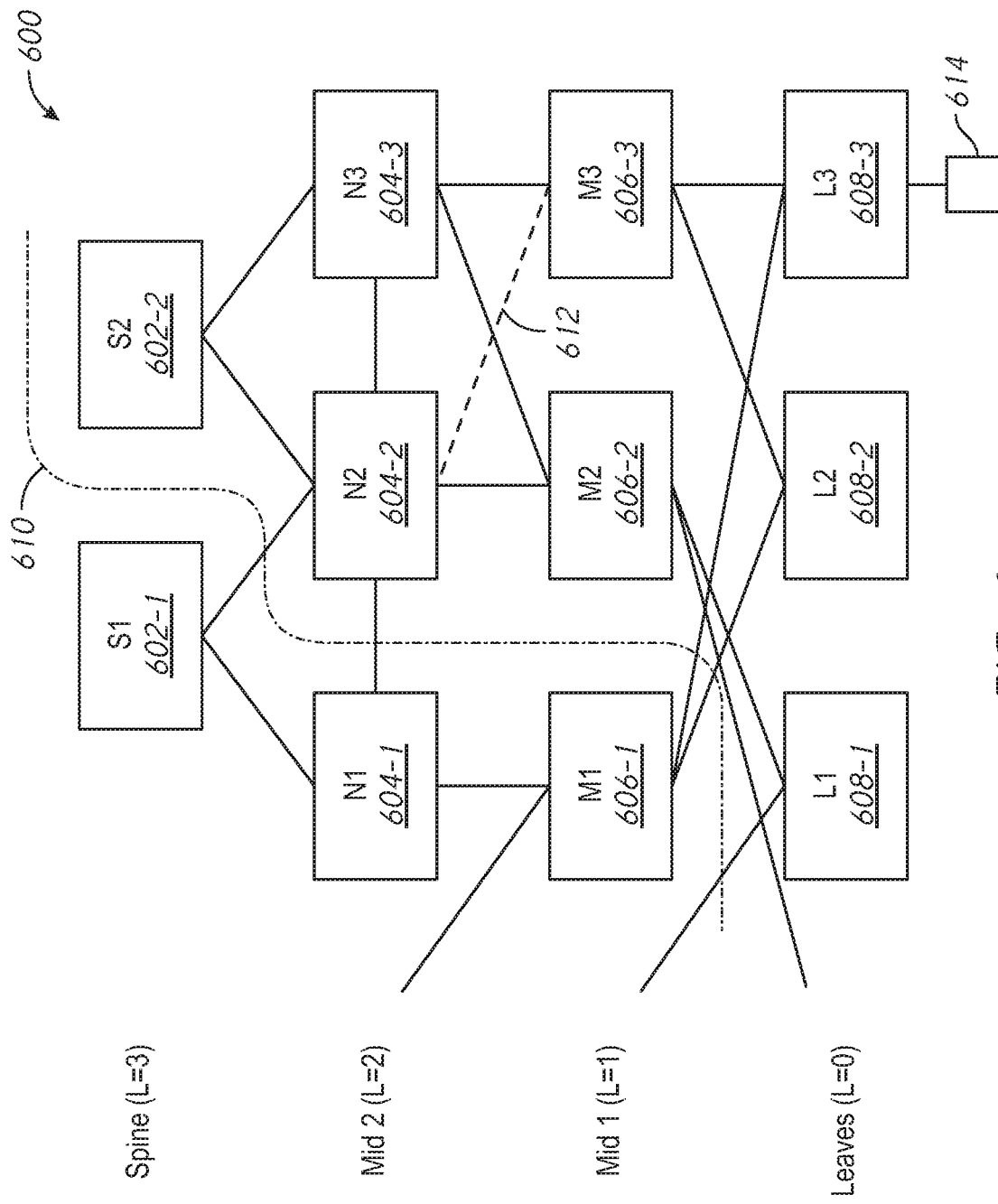
FIG. 6 is an example node graph that illustrates a portion of an example network with route disaggregation.

FIG. 6 is an example node graph that illustrates an example network 600 with route disaggregation. The network 600 may include spine nodes 602-1 and 602-2, which may be collectively referred to as spine nodes 602. The network 600 may include mid-level nodes that may be organized in multiple levels, e.g., mid-level nodes 604-1, 604-2, and 604-3 (collectively known as mid-level nodes 604) and mid-level nodes 606-1, 606-2, and 606-3 (collectively known as mid-level nodes 606). The network 600 may include leaf nodes 608-1, 608-2, and 608-3 (collectively known as leaf nodes 608).

Incomplete perception of the network 600 may result in false positives. For example, the spine node 602-2 may be associated with a shadow cone, e.g., a set of nodes that the spine node 602-2 can flood with a recursive disaggregation. A northern boundary 610 of the shadow cone may demarcate the extent of the nodes of which the spine node 602-2 may have full awareness. For example, the spine node 602-2 may know that the spine node 602-1, which is outside of the shadow cone, has connectivity from the mid-level node 604-1 (which is also outside of the shadow cone), but the spine node 602-2 may not know which connectivity the spine-node 602-1 has from the mid-level node 604-1. Through reflection, the spine node 602-2 may know about the adjacencies of other spine nodes, so that the spine node 602-2 can guess their aggregate one-hope flooding scope for disaggregated routes. However, the spine node 602-2 may know whether the other spine nodes 602 flood only if the spine node 602-2 knows all of the children nodes of the other spine nodes 602

The spine node 602-2 may not have sufficient information to determine a course of action in the event that a link 612 between the mid-level node 604-2 and the mid-level node 606-3 may break. In the absence of this information, the spine node 602-2 may behave optimistically and presume that the nodes that it cannot see will cover the connectivity that is needed to reach a prefix 614 that is attached to the leaf node 608-3. The spine node 602-2 may behave pessimistically and presume that the nodes that it cannot see will not cover the needed connectivity to reach the prefix 614. This pessimistic approach may be safer in that it is more likely to ensure connectivity to the prefix 614. The pessimistic approach may, in some cases, lead to unnecessary route disaggregation. For example, in the network 600, the spine node 602-1 has connectivity to the leaf node 608-3, and therefore to the prefix 614, via the mid-level nodes 604-1 and 606-1, which are outside the shadow cone of the spine node 602-2 and which may not be subject to examination by the spine node 602-2.

Figure 7:
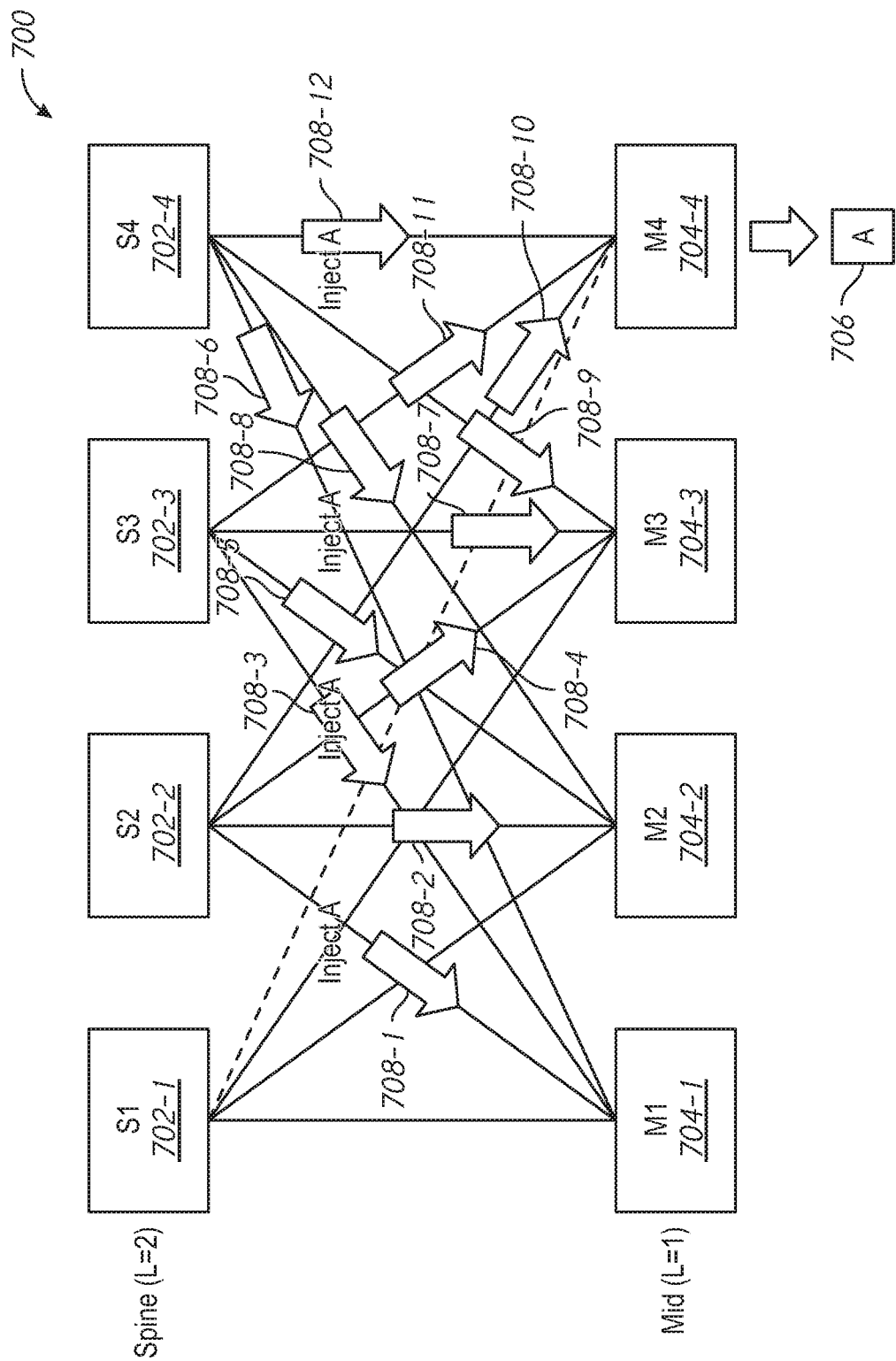
FIG. 7 is an example node graph that illustrates an example network.

FIG. 7 is an example node graph that illustrates an example network 700. The network 700 may include spine nodes 702-1, 702-2, 702-3, and 702-4, which may be collectively referred to as spine nodes 702. The network 700 may include mid-level nodes 704-1, 704-2, 704-3, and 704-4, which may be collectively referred to as mid-level nodes 704. A prefix 706 may be reachable by the mid-level node 704-4. In a scenario involving disaggregation, issues may arise from the disaggregation process. A disaggregated route may be an exception to a default route. The disaggregated route may not be advertised as a disaggregated route. It may not be possible to program an exception. Accordingly, for example, if one northbound port out of twenty ports cannot be used to reach a prefix, the route to the prefix may be installed on the other (e.g., all nineteen other) ports. As such, all nineteen ports must flood the disaggregated route to the prefix southbound. Thus, the process of disaggregation as it stands in RIFT may cause vast amounts of flooding in a mostly fully-meshed situation. In the example of FIG. 7, a total of twelve messages 708-1, 708-2, 708-3, ..., 708-12 may result in routes to the prefix 706 via the spine nodes 702-2, 702-3, and 702-4. The routes may be installed in the mid-level nodes 704-1, 704-2, 704-3, and 704-4.

In a complex fat tree with a disjoint spine, even a pessimistic approach may lead to so-called black holes in which connectivity may not be ensured. In the context of networking, a black hole may be a place in a network in which incoming and/or outgoing traffic may be silently discarded or dropped without informing the source that the data did not reach its intended recipient. The pessimistic approach may not have complete awareness of all of the spine nodes in a network. Virtual links may be used to join spine nodes, but the use of virtual links to join spine nodes may not be effective in link state routing protocols.

In some embodiments, RIFT may take a pessimistic approach to decrease the likelihood of black holes. In order to keep the base protocol simple, route disaggregation may always be performed transitively because it may be difficult to determine whether it is necessary to perform route disaggregation transitively in a given situation. It may be desirable to control the considerable amount of flooding that may result.

In some embodiments, one or more spine nodes (e.g., each spine node) may compute a subtree of its shadow cone. A shadow cone may be a collection of the switches that the spine node can reach. A spine node may ensure that packets are forwarded along the subtree. Flooding may be performed in any of a variety of ways. The forwarding plane may be implemented in any of a variety of ways.

In some embodiments, a filtering technique may involve signaling the subtree in the topology information element (TIE) that propagates the disaggregated route southbound. This may result in filtering the southbound advertisement so that it is performed along the subtree (e.g., only along the subtree). This technique can operate with dumb switches and in the absence of source routing.

In some embodiments, segment routing may be used to steer traffic from a leaf node toward a disaggregating switch over two or more non-congruent paths. This technique may involve support for segment routing from the L3 switches in the fabric.

In some embodiments, source/destination (S/D) routing may be used. S/D routing may be used in some environments related to multi-homing, for example. This approach may avoid source routing, but may involve complex forwarding.

Figure 8:
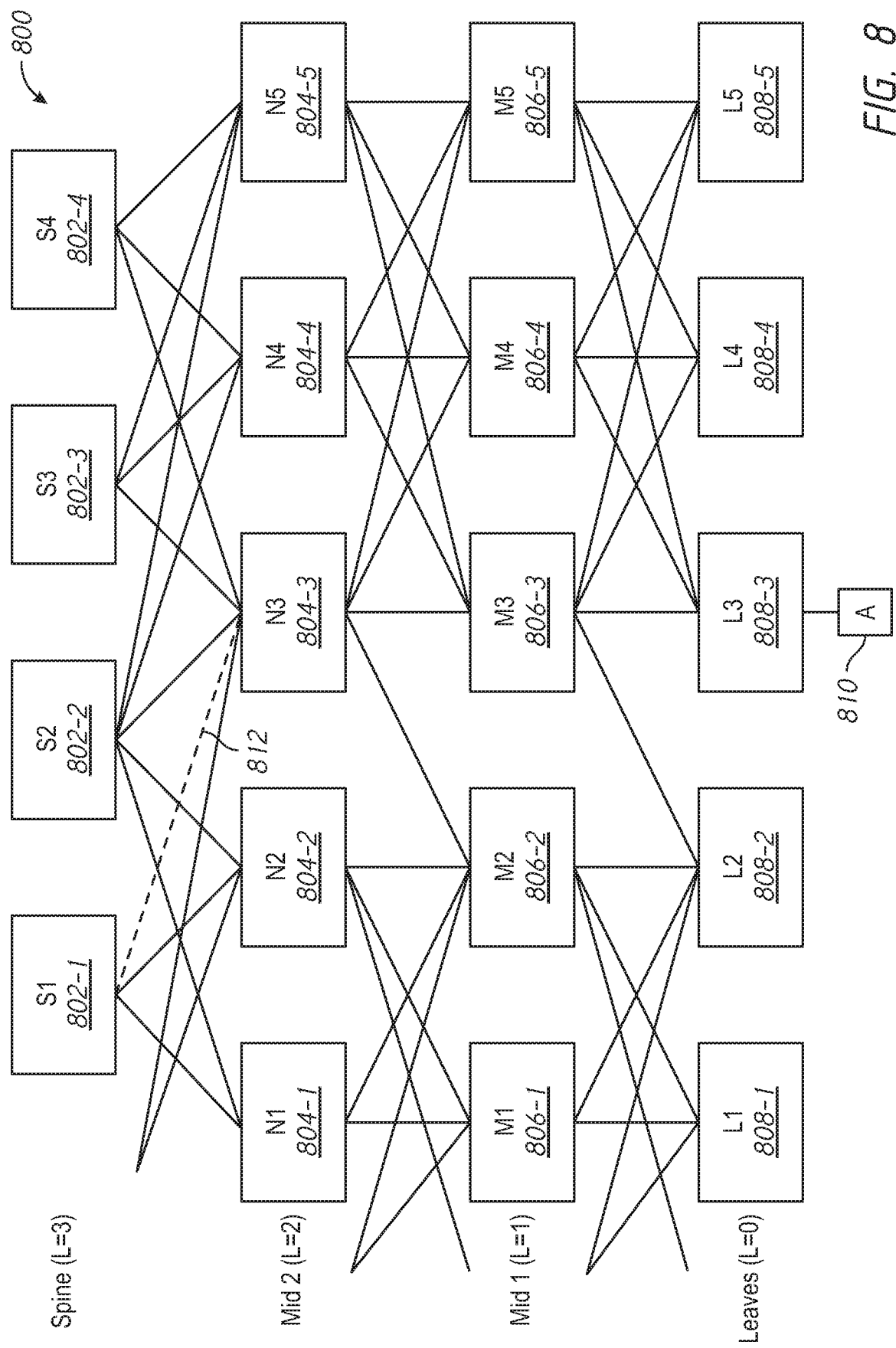
FIG. 8 is an example node graph that illustrates an example network.

FIG. 8 is a node graph that illustrates an example network 800 that may control flooding while maintaining redundancy for packets. FIG. 8 illustrates a fabric that may be affected, for example, by earlier breakages, missing cables, insufficient planning, or other circumstances that may adversely affect the network 800. The network 800 may include spine nodes 802-1, 802-2, 802-3, and 802-4 (collectively referred to as spine nodes 802), a first level of mid-level nodes 804-1, 804-2, 804-3, 804-4, and 804-5 (collectively referred to as mid-level nodes 804), a second level of mid-level nodes 806-1, 806-2, 806-3, 806-4, and 806-5 (collectively referred to as mid-level nodes 806), and leaf nodes 808-1, 808-2, 808-3, 808-4, and 808-5 (collectively referred to as leaf nodes 808). The spine node 802-1 may have a link to a prefix 810, attached to the leaf node 808-3, only through the mid-level node 804-2. As indicated by a dashed line in FIG. 8, a link 812 between the spine node 802-1 and the mid-level node 804-3 may be broken. Accordingly, the prefix 810 may be disaggregated.

In some embodiments, the leaf nodes (e.g., all leaf nodes) may be flooded with a disaggregated route that provides redundancy either at each hop or end-to-end. Selected paths may enable the shortest paths available in the fabric. Some embodiments may favor paths that reach the lowest common parents. Control traffic that may be involved in the flooding may be reduced or minimized. Different spine nodes may compute trees that are substantially congruent so as to limit the amount of state information that may be maintained in the network.

The techniques described herein may not involve building a Steiner tree that encompasses all the leaf nodes 808 and the spine nodes 802. Building a Steiner tree may be optimized for the route distribution, e.g., as opposed to data packet flows.

Figure 9:
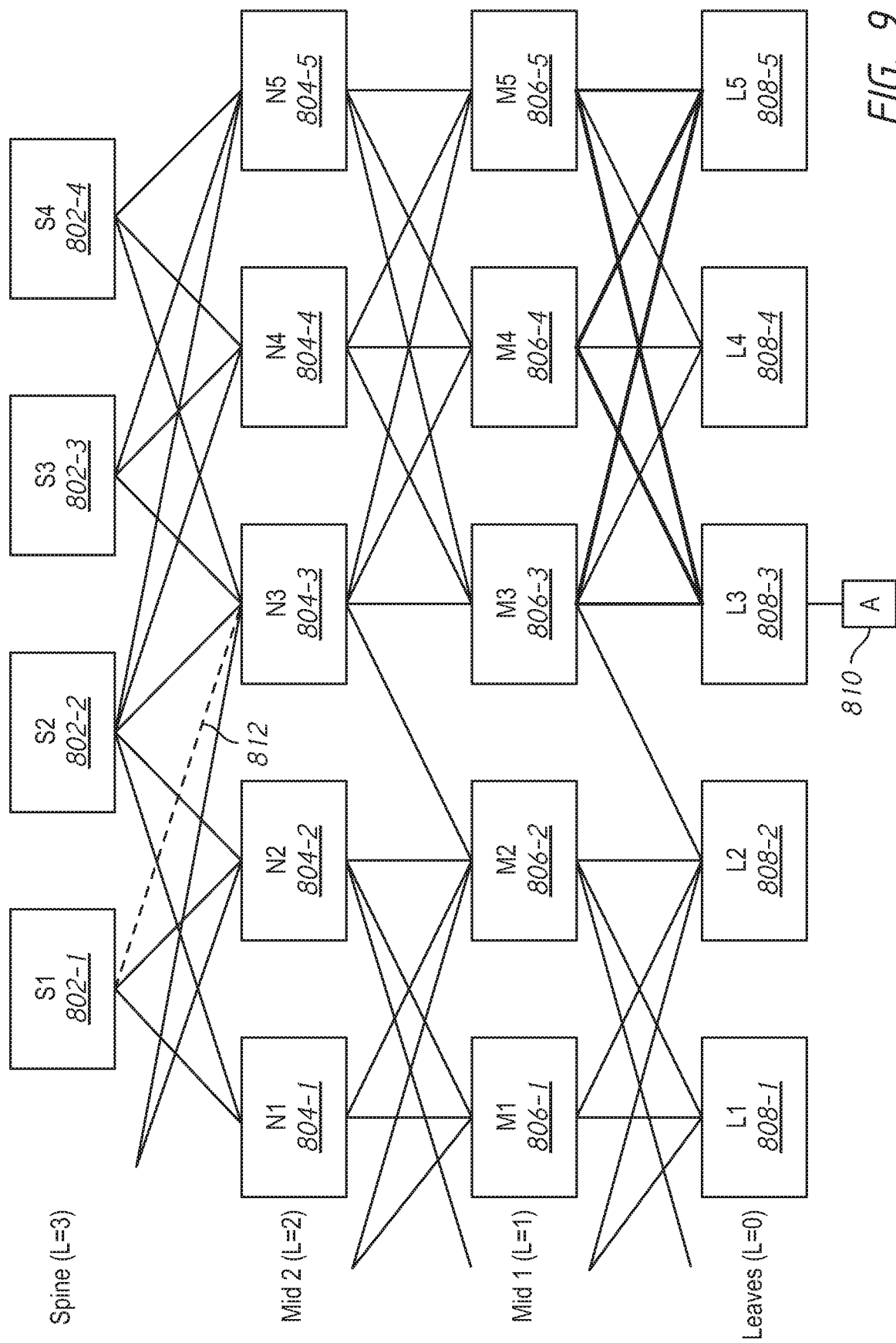
FIG. 9 is a diagram that illustrates an example technique for computing a subtree.

FIG. 9 illustrates an example technique for computing a subtree. To compute a subtree of the shadow cone, a spine node, e.g., the spine node 803-3, may consider the leaf node where the disaggregated prefix (e.g., the prefix 810) is attached, e.g., the leaf node 808-3 in FIG. 9. Leaf nodes for which the longest match routing may not (e.g., will never) use the spine node 808-1 (e.g., the leaf nodes 808-4 and 808-5) may be ignored. The parent nodes, e.g., the mid-level nodes 806-3, 806-4, and 806-5, may have a more specific route to the leaf node 808-3. Accordingly, there may be no need for the parent nodes to disaggregate. For example, the bold lines in FIG. 9 indicate possible paths from the leaf node 808-5 to the leaf node 808-3.

Figure 10:
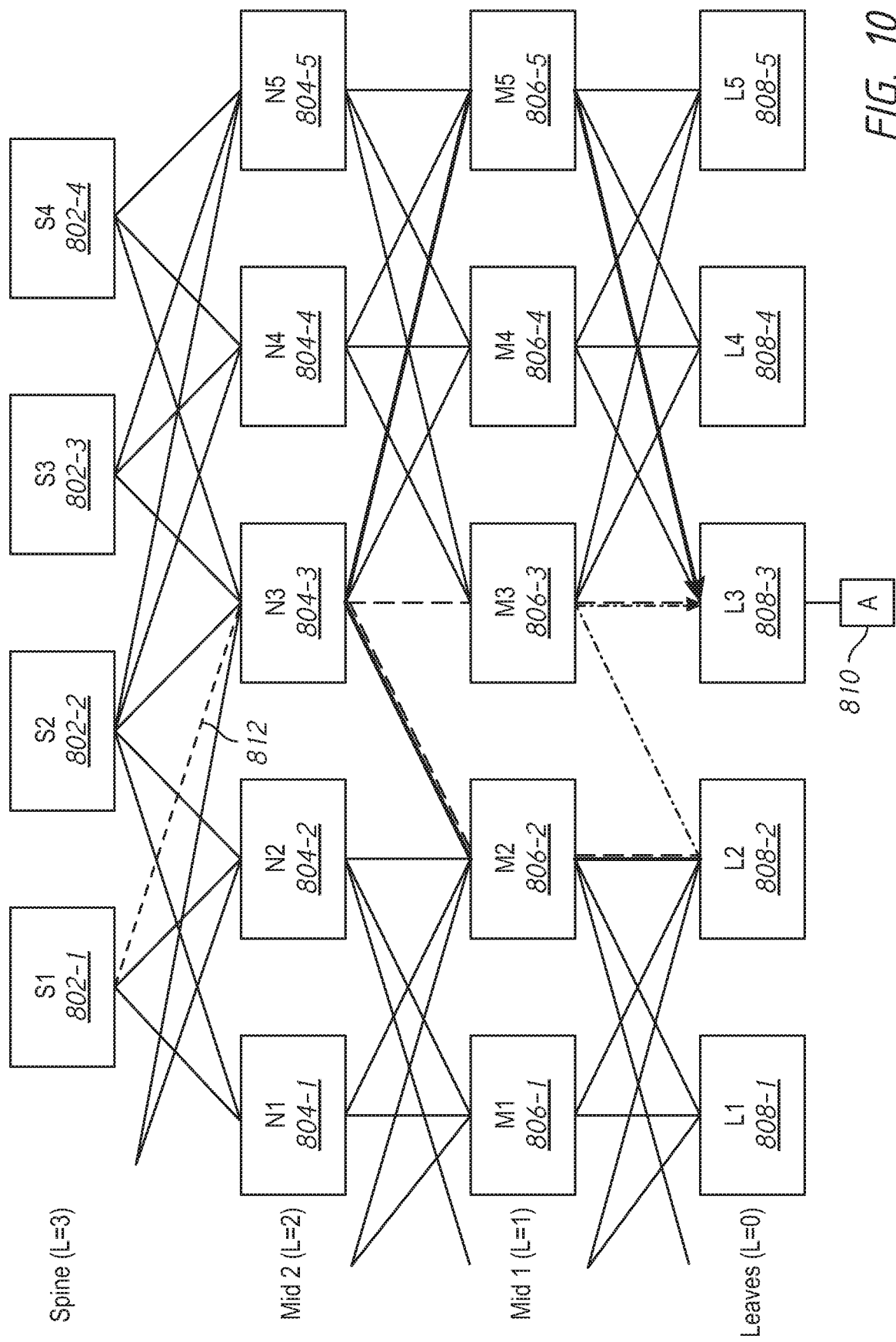
FIG. 10 is a diagram that illustrates how a spine node may use topological information relating to a shadow cone.

FIG. 10 illustrates how the spine node 802-2 may use topological information relating to a shadow cone. The leaf node 808-2 may use a default route to the mid-level node 804-1 (e.g., as opposed to the mid-level node 804-3) to reach the prefix 810. Packets to the prefix 810 may be black-holed if the link 812 between the spine node 802-1 and the mid-level node 804-3 breaks. Accordingly, the spine node 802-2 may be disaggregated from the prefix 810. The spine node 802-2 may compute, for one remaining leaf node at a time, the K-shortest paths to the leaf node 808-3 from the perspective of each leaf node 808 (e.g., using Yen's algorithm for loopless K-Shortest Paths), where K is an integer. K may be taken in the order of the number of the width of a Point of Delivery (PoD) or more to obtain sufficient path diversity. FIG. 10 illustrates the case of the three shortest paths (e.g., K=3) from the leaf node 808-2 to the leaf node 808-3. From the mid-level nodes 804-3 and 806-3 down, the paths may follow the normal routing along the fabric. There may be no need to install a state. Only routes in the leaf node 808-2 that point to the mid-level nodes 806-2 and 806-3 and a route in the mid-level node 806-2 that points to the mid-level node 804-3 as the feasible successors towards the prefix 810 may need to be installed.

Figure 11:
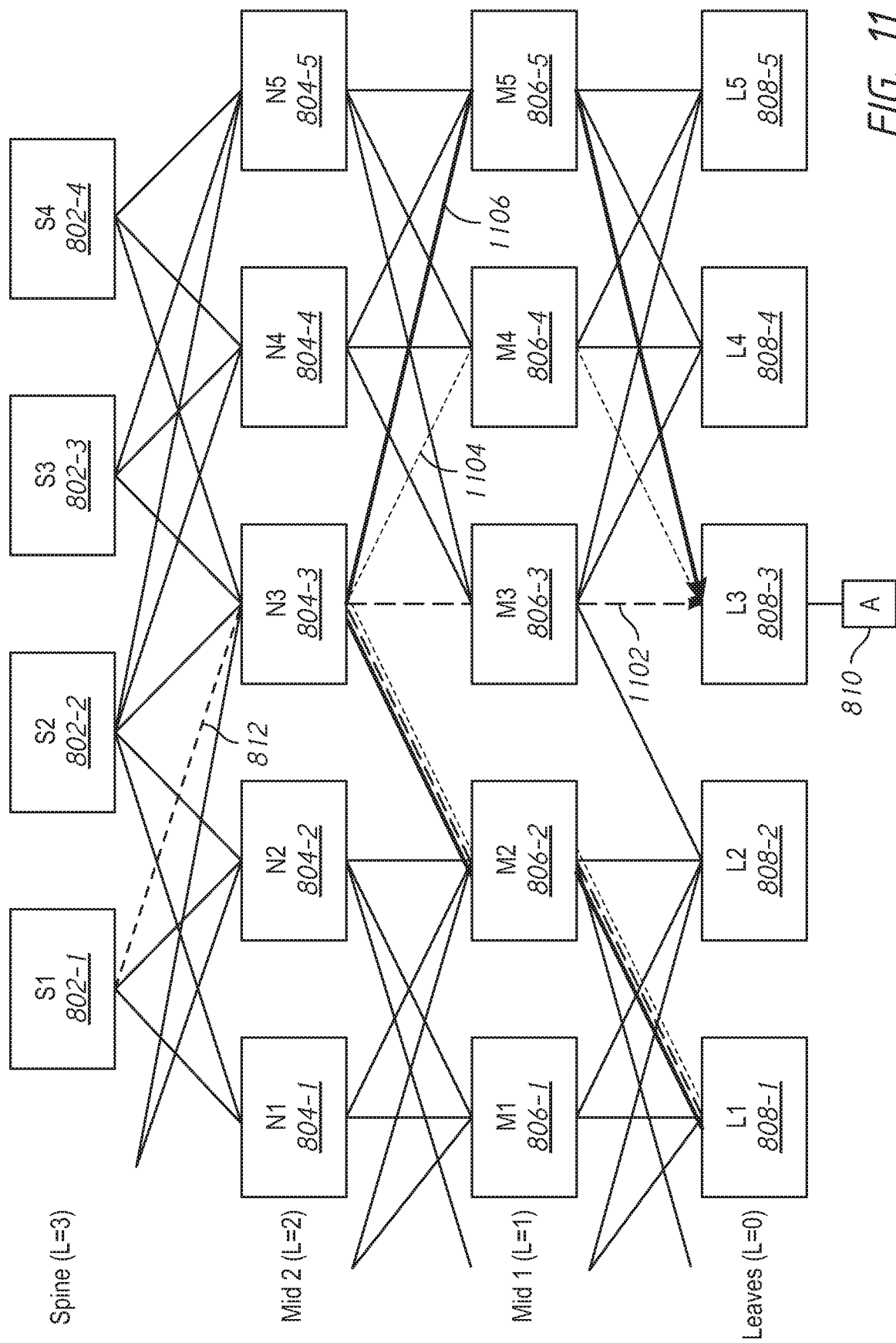
FIG. 11 is a diagram that illustrates example paths for a leaf node.

FIG. 11 illustrates example paths for the leaf node 808-1 obtained with the same three shortest paths (e.g., K=3) computation. For example, a spine node 802 may calculate three paths 1102, 1104, 1106 from the leaf node 808-1 to the leaf node 808-3.

Figure 12:
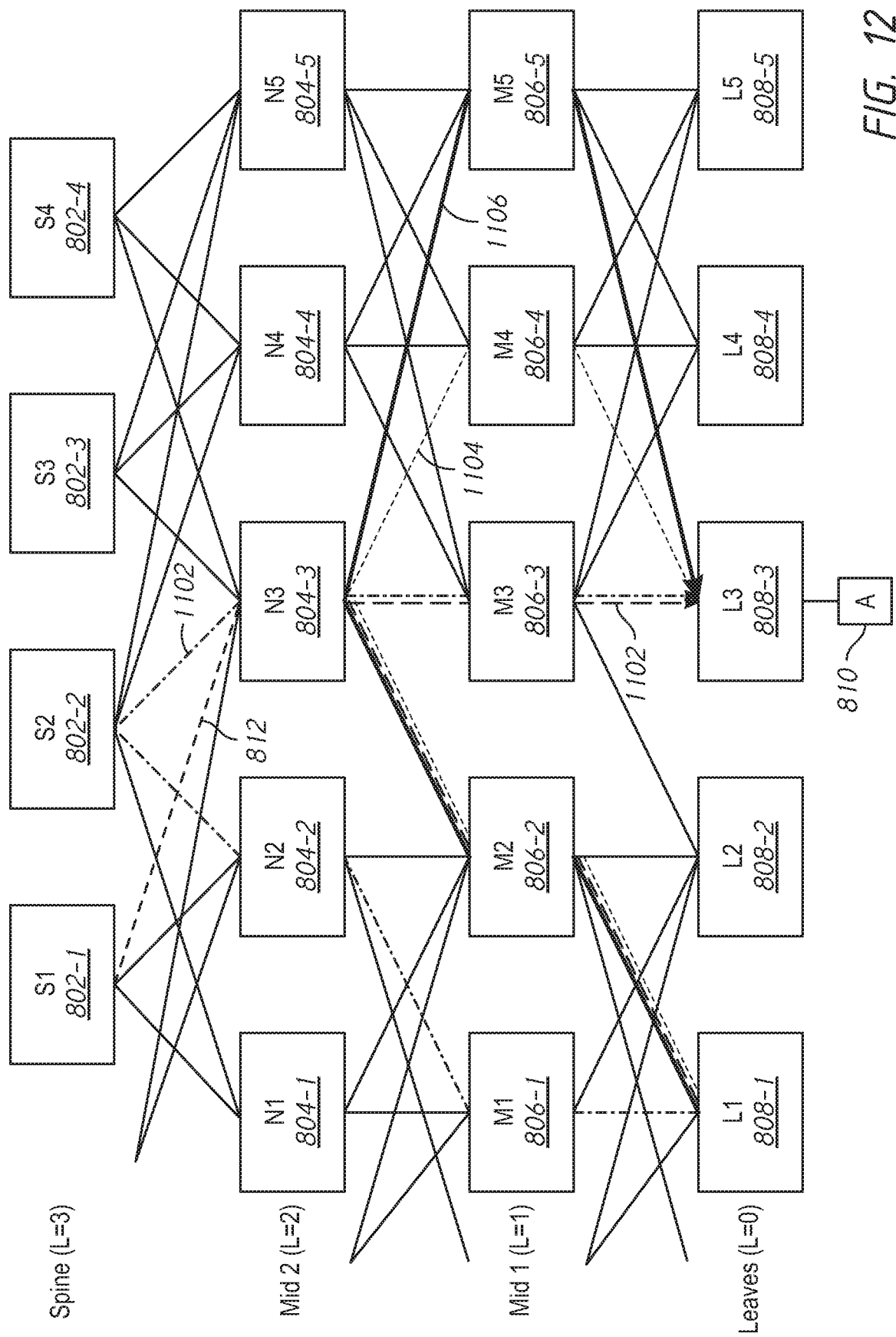
FIG. 12 is a diagram that illustrates additional example paths for a leaf node.

FIG. 12 illustrates how setting K to a value of K=4 or K=6 may provide additional diverse paths in order to achieve more path diversity. For example, in FIG. 12, besides the three paths 1102, 1104, 1106 shown in FIG. 11, an additional path 1202 from the leaf node 808-1 to the leaf node 808-3 may be computed.

Figure 13:
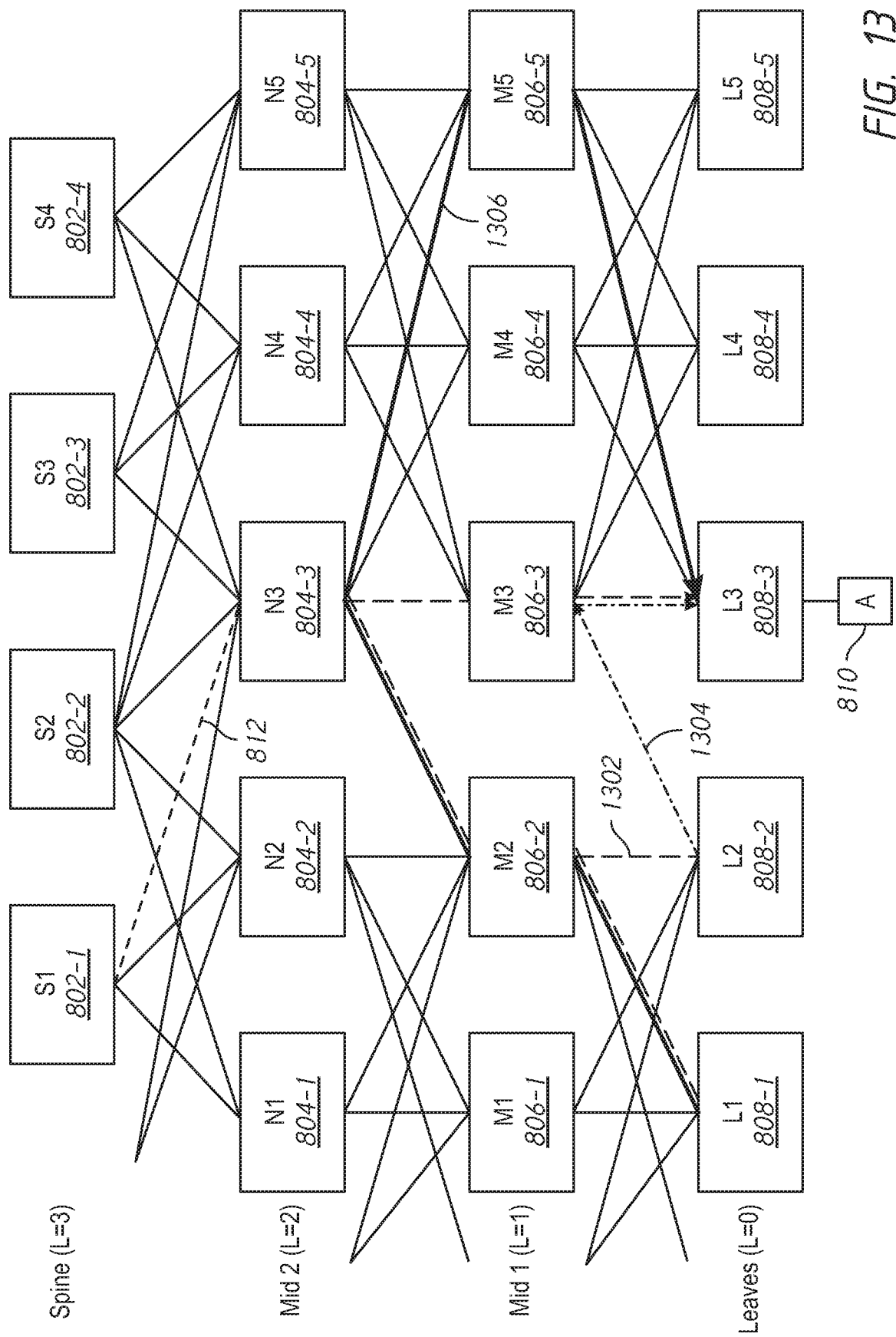
FIG. 13 is a diagram that illustrates a number of paths that may be identified.

The operations described herein may explore all the combinations of K paths from a leaf node 808 (e.g., leaf node 808-1, leaf node 808-2, leaf node 808-4, or leaf node 808-5) to the leaf node 808-3, in an effort to find K trees that reduce or minimize the total number of nodes in a tree and/or the number of nodes that may be common between the two trees. In order to find a solution quickly, an approximation may be made favoring the non-congruence between the trees and/or paths to the other leaves. FIG. 13 illustrates a number of paths 1302, 1304, 1306 that may be identified via the operations described herein.

In some embodiments, a spine node (e.g., the spine node 802-2) may not compute the K shortest paths from the perspective of other leaf nodes (e.g., the leaf nodes 808-1 and 808-2) toward the partially eclipsed, or fallen, leaf node, e.g., a leaf node 808 that may not be seen by one or more spine nodes 802 (e.g., the leaf node 808-3). Instead, the spine node 802-2 may compute a reverse destination oriented directed acyclic graph (DODAG) of the network from the perspective of the partially eclipsed leaf node, e.g., using subject matter disclosed in U.S. Pat. No. 7,656,857, issued Feb. 2, 2010, and entitled "DIRECTED ACYCLIC GRAPH COMPUTATION BY ORIENTING SHORTEST PATH LINKS AND ALTERNATE PATH LINKS OBTAINED FROM SHORTEST PATH COMPUTATION," the disclosure of which is hereby incorporated by reference in its entirety. This technique may reduce the computation cost for each spine node from one per other leaf (e.g., the leaf nodes 808-1 and 808-2) to just one for the partially-eclipsed leaf node (e.g., the leaf node 808-3).

As disclosed in the aforementioned United States Patent, a node may use a modified shortest path first (SPF) technique, known as SPF-TOP, to build a DODAG that it is oriented towards itself, as opposed to a tree that is oriented away from itself. The DODAG may include the SPF tree.

Figure 15:
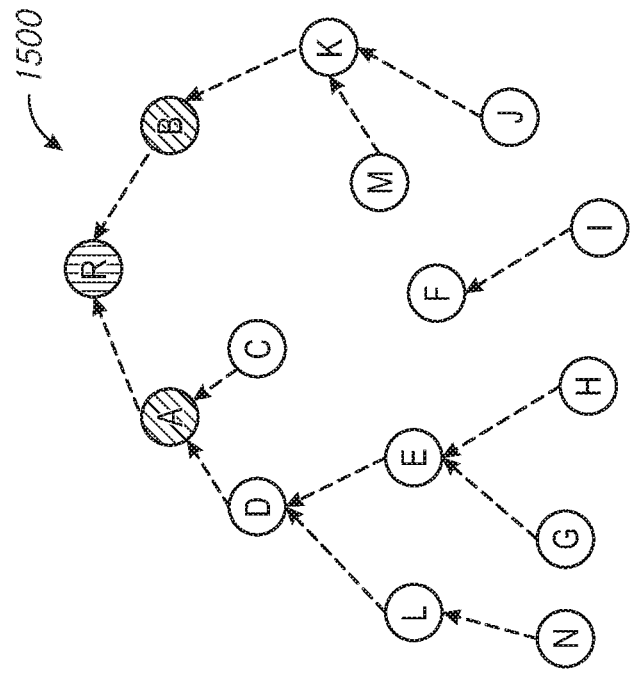
FIG. 15 is a node graph that represents a tree that may be generated using a reverse shortest paths first (SPF) technique.
Figure 14:
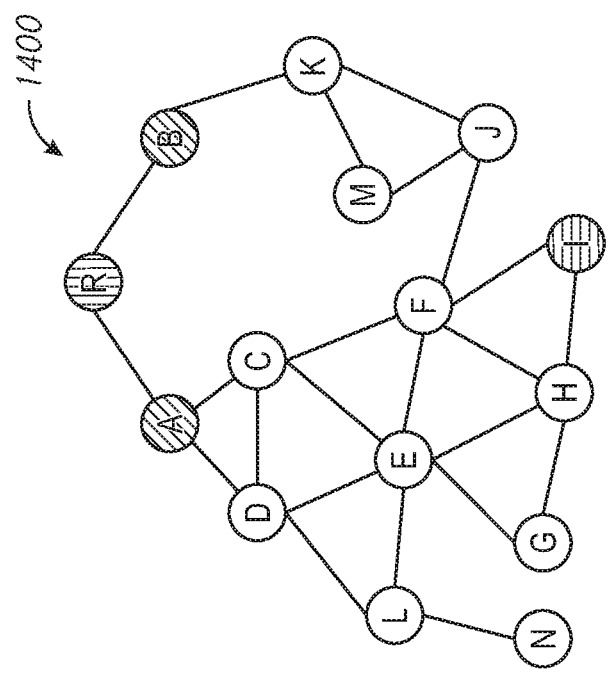
FIG. 14 is a node graph that represents an example network.
Figure 16:
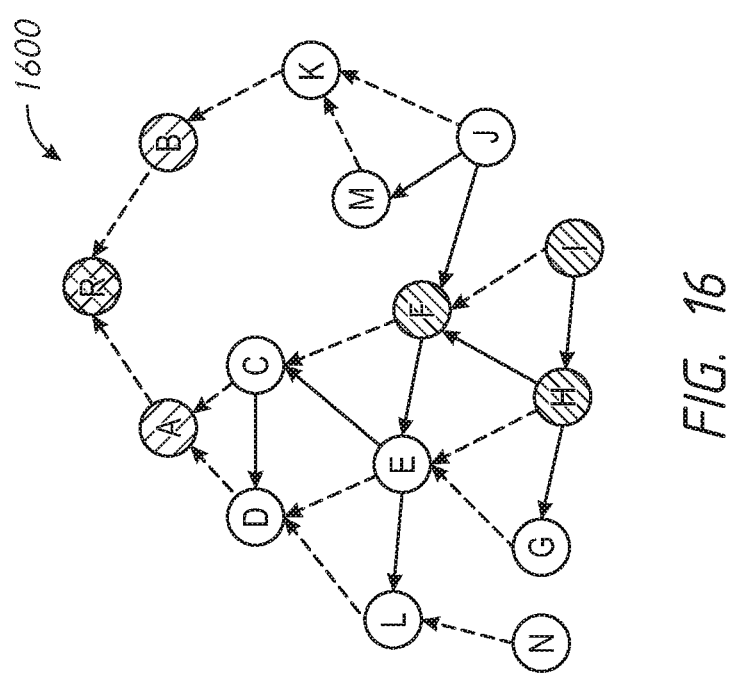
FIG. 16 is a diagram that illustrates a destination oriented directed acyclic graph (DODAG).

For example, FIG. 14 is a node graph 1400 that may represent an example network. A reverse SPF technique, such as SPF-TOP, may compute a tree 1500 as illustrated in FIG. 15. A node, such as a spine node 802, may build a DODAG according to the subject matter disclosed in the aforementioned United States Patent. FIG. 16 illustrates an example DODAG 1600.

Figure 17:
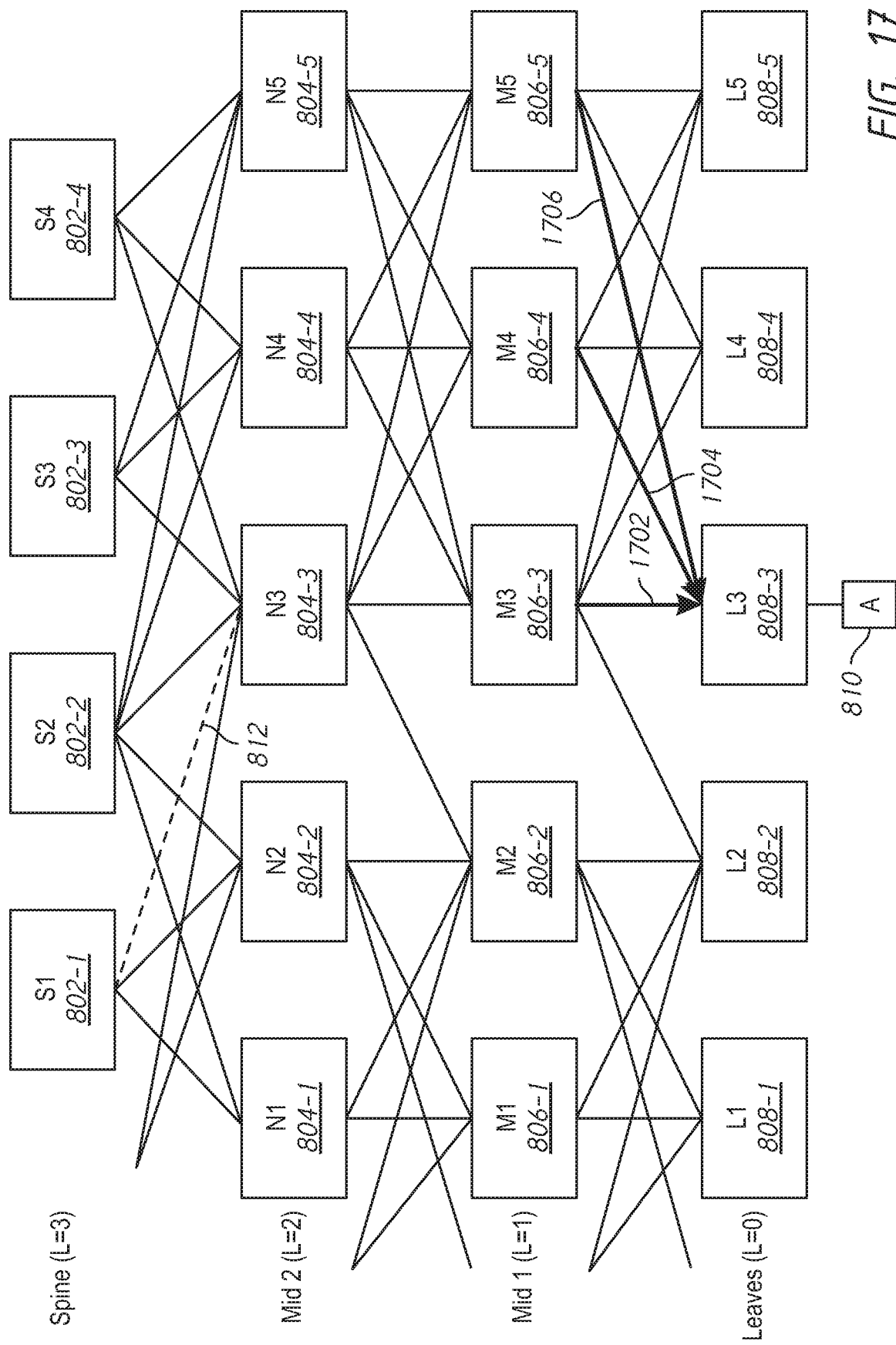
FIG. 17 is a diagram illustrating an example selection of links in the network of FIG. 8.

In some embodiments, a spine node, such as the spine node 802-2, may calculate a tree on behalf of a leaf node that is not reachable from one or more certain other spine nodes (e.g., the leaf node 808-3, which is not reachable from the spine node 802-1). Because the process starts at a leaf node, the initial links are northbound. These initial links may be computed, but not included in the tree. FIG. 17 illustrates example initial links 1702, 1704, and 1706 that may be computed.

Figure 18:
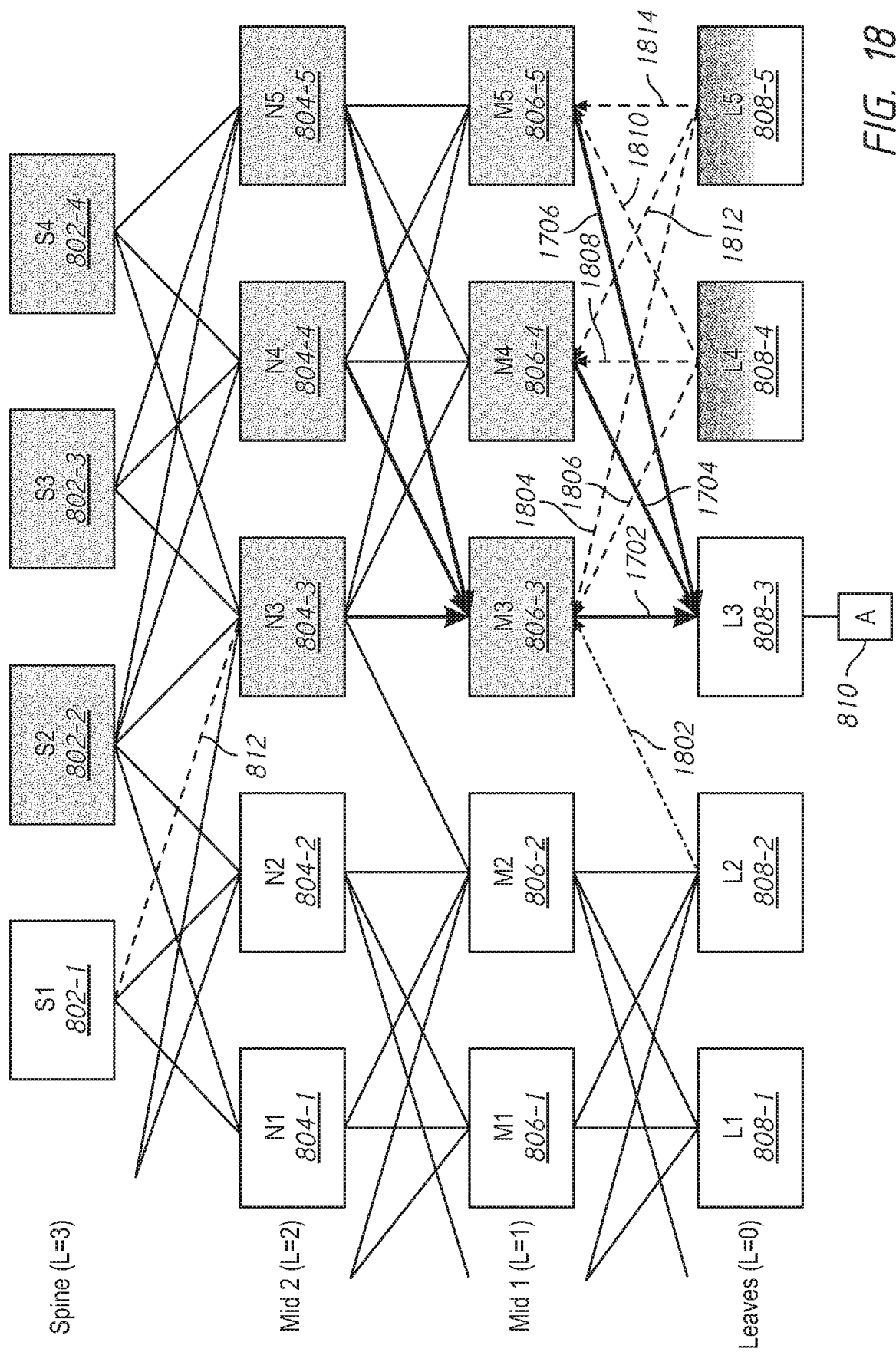
FIG. 18 is a diagram illustrating an example selection of links in the network of FIG. 8.

The spine node may use a directed acyclic graph (DAG) to build northward links until the first northward link appears. FIG. 18 illustrates example northward links that may be built. Some northward links, such as a link 1802, may be kept. Other northward links, such as links 1804, 1806, 1808, 1810, 1812, and 1814, may be discarded. A northward link may be discarded, for example, if both of the nodes involved in the link are in a set S of nodes. The set S of nodes may include nodes for which the spine node 802-1 does not form part of any path to the leaf node 808-3. The set S of nodes may include the nodes in the shadow cone of the leaf node 808-3, e.g., the spine nodes 802-2, 802-3, and 802-4; the mid-level nodes 804-3, 804-4, and 804-5; and the mid-level nodes 806-3, 806-4, and 806-5. This property may be transitive, such that a node for which all northbound adjacencies are in the set S of nodes is also in the set S of nodes. Accordingly, for example, the leaf nodes 808-4 and 808-5 may be included in the set S of nodes.

Figure 19:
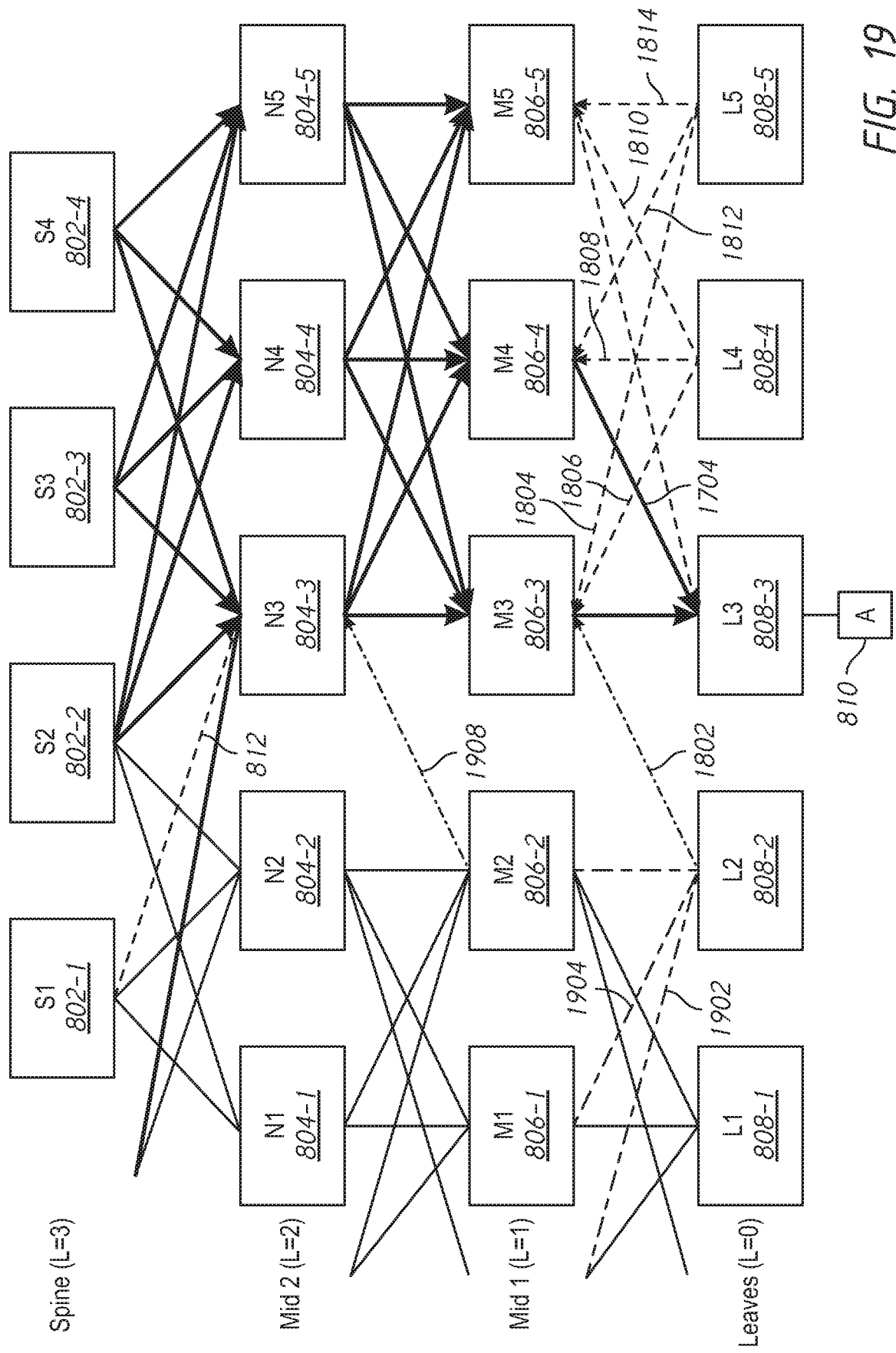
FIG. 19 is a diagram illustrating an example selection of links in the network of FIG. 8.
Figure 20:
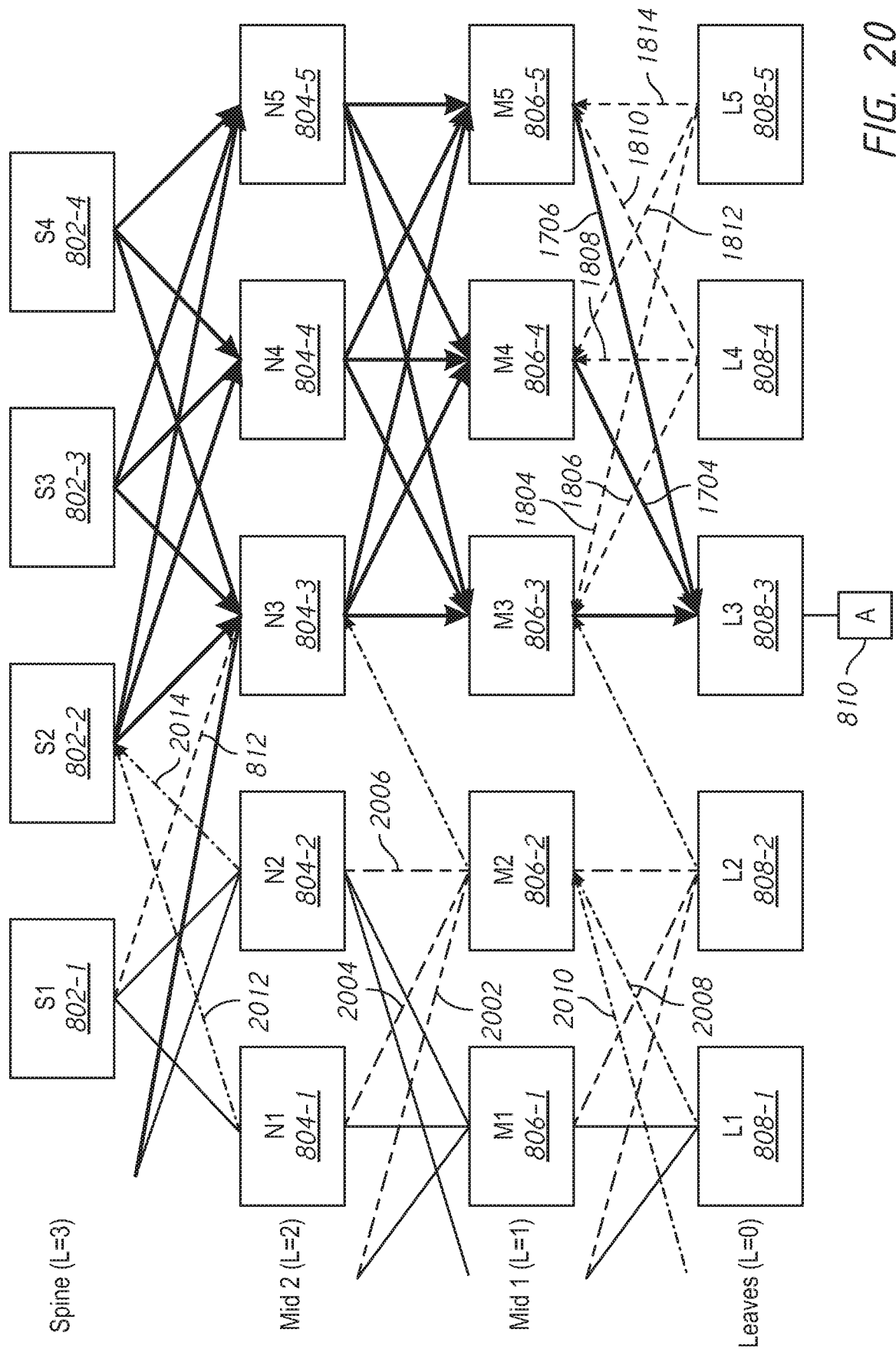
FIG. 20 is a diagram illustrating an example selection of links in the network of FIG. 8.
Figure 21:
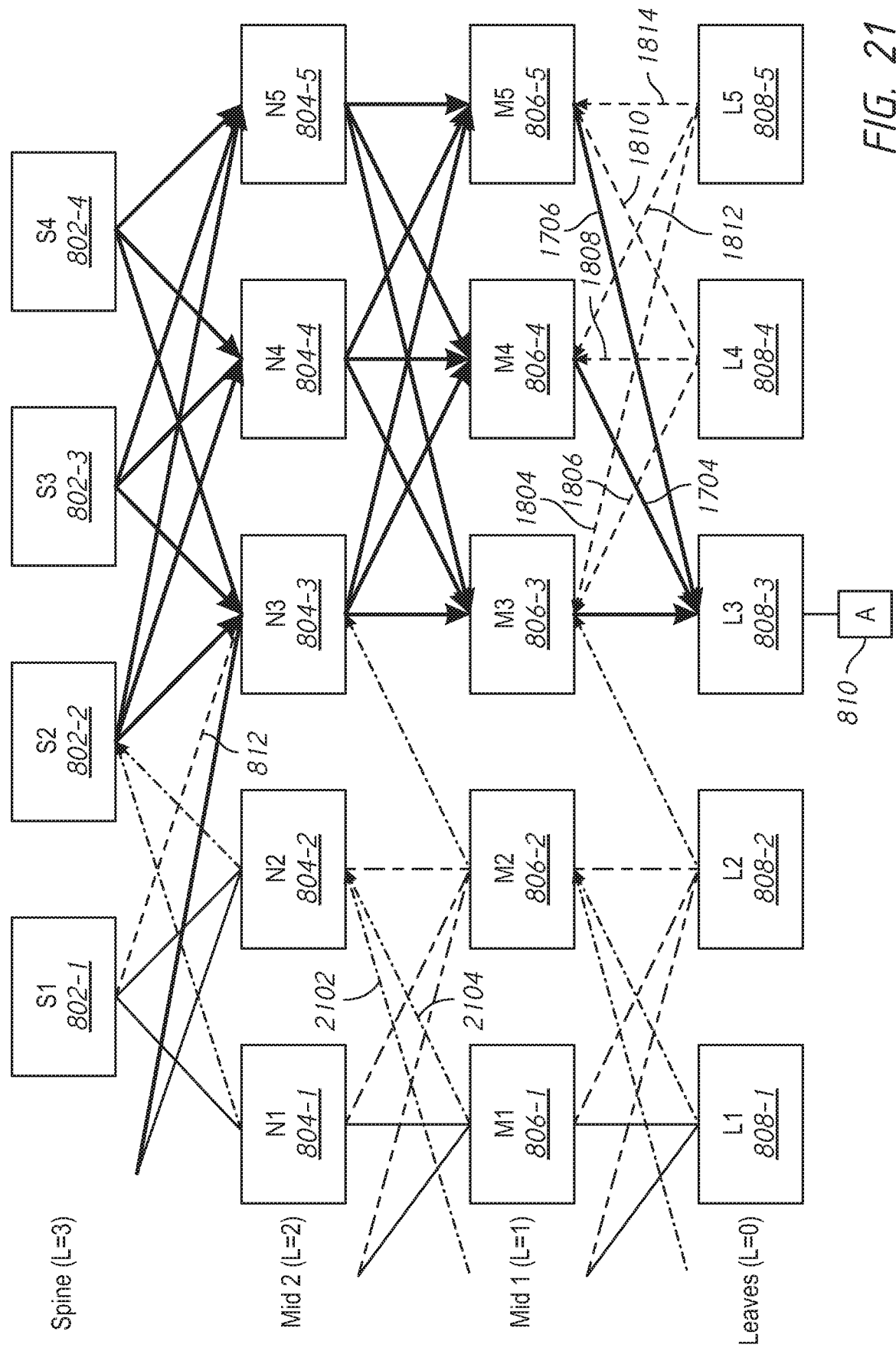
FIG. 21 is a diagram illustrating an example selection of links in the network of FIG. 8.
Figure 22:
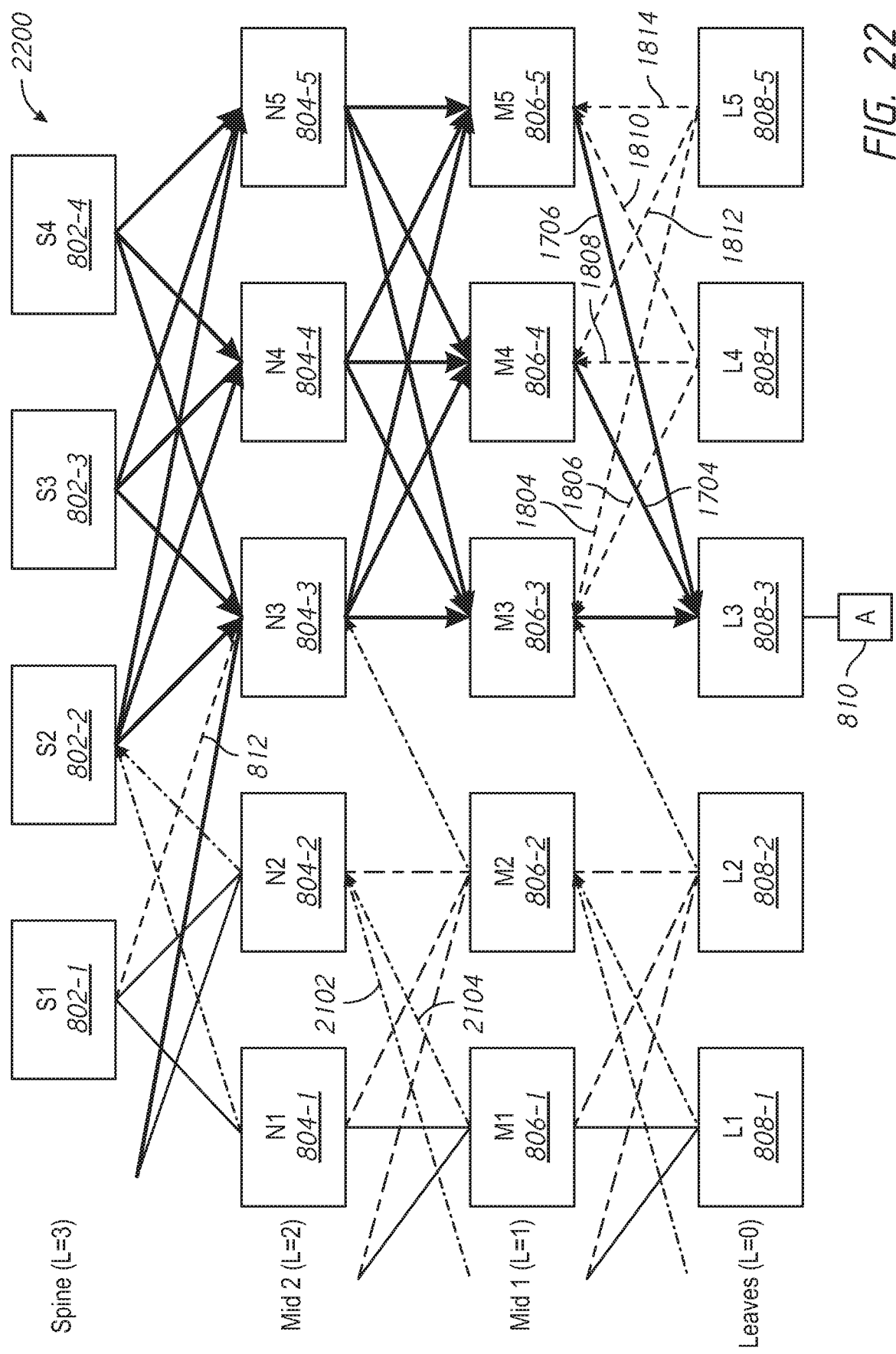
FIG. 22 is a diagram illustrating an example directed acyclic graph (DAG).

A node that has outgoing links south that are kept in the DAG may not be able to accept traffic from the north. Links coming from the north may be ignored in the computation. FIG. 19 illustrates example links that may be ignored, including links 1902, 1904, and 1906. FIG. 19 also illustrates a link 1908 that may be kept. The computation of the DAG may proceed. FIG. 20 illustrates additional example links that may be ignored, including links 2002, 2004, and 2006. FIG. 20 also illustrates links that may be kept, including, for example, links 2008, 2010, 2012, and 2014. The computation of the DAG may proceed. FIG. 21 illustrates additional example links that may be kept as the computation of the DAG proceeds further, including links 2102 and 2104. FIG. 22 illustrates an example DAG 2200 that may result from the series of processes disclosed herein in connection with FIGS. 17-21.

Figure 23:
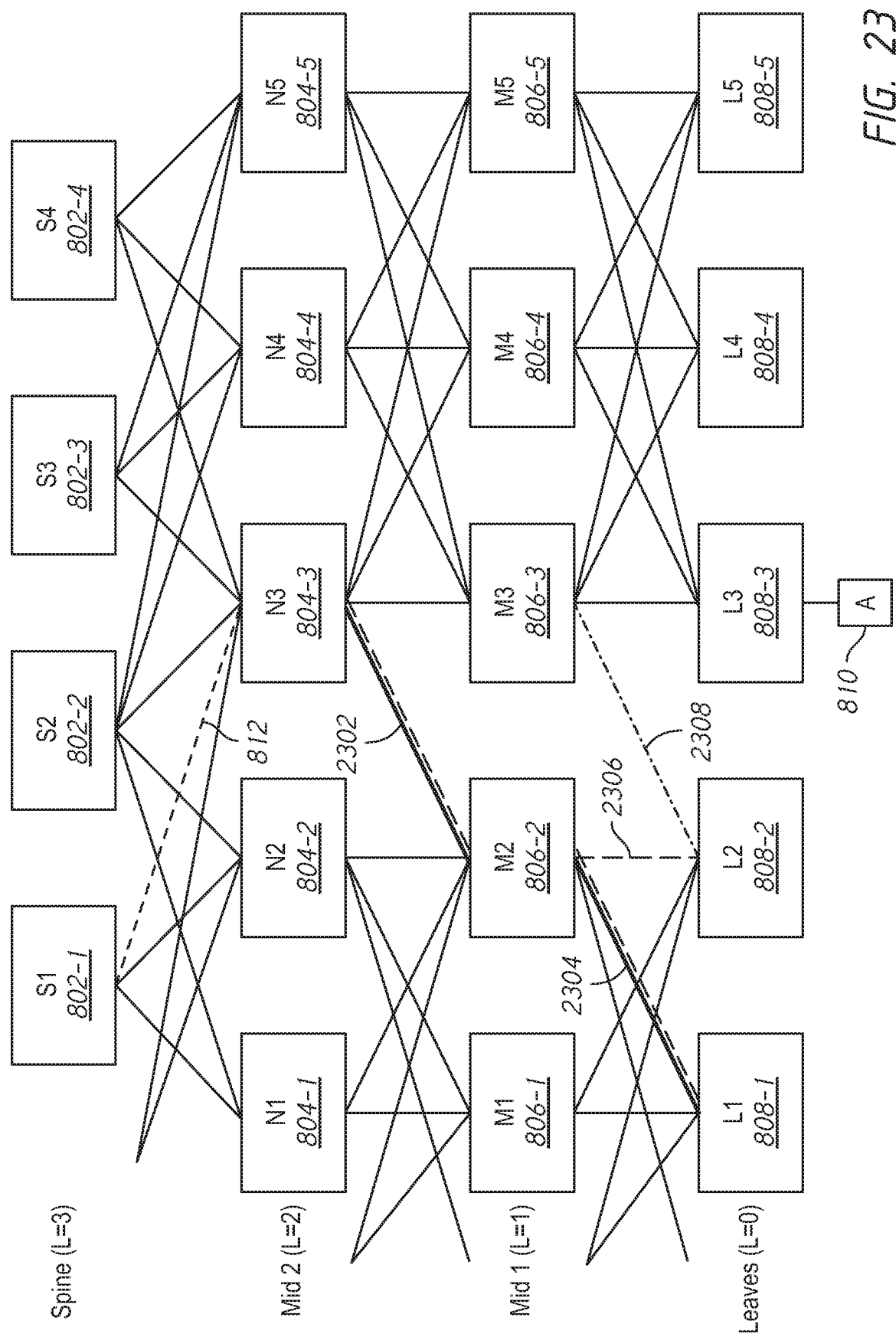
FIG. 23 is a diagram that illustrates an example set of links that may be retained

In some embodiments, links that are not congruent with routes already selected via the operations described herein may be retained. For example, only links moving upward (e.g., from the leaf nodes 808 toward the spine nodes 802) may be retained. FIG. 23 illustrates an example set of links that may be retained. These links may include, for example, a link 2302 from the mid-level node 806-2 to the mid-level node 804-3, a link 2304 from the leaf node 808-1 to the mid-level node 806-2, a link 2306 from the leaf node 808-2 to the mid-level node 806-2, and a link 2308 from the leaf node 808-2 to the mid-level node 806-3. These are the links on which a new distance vector (DV) of the prefix 810 may be sent to install a disaggregated route north.

Figure 24:
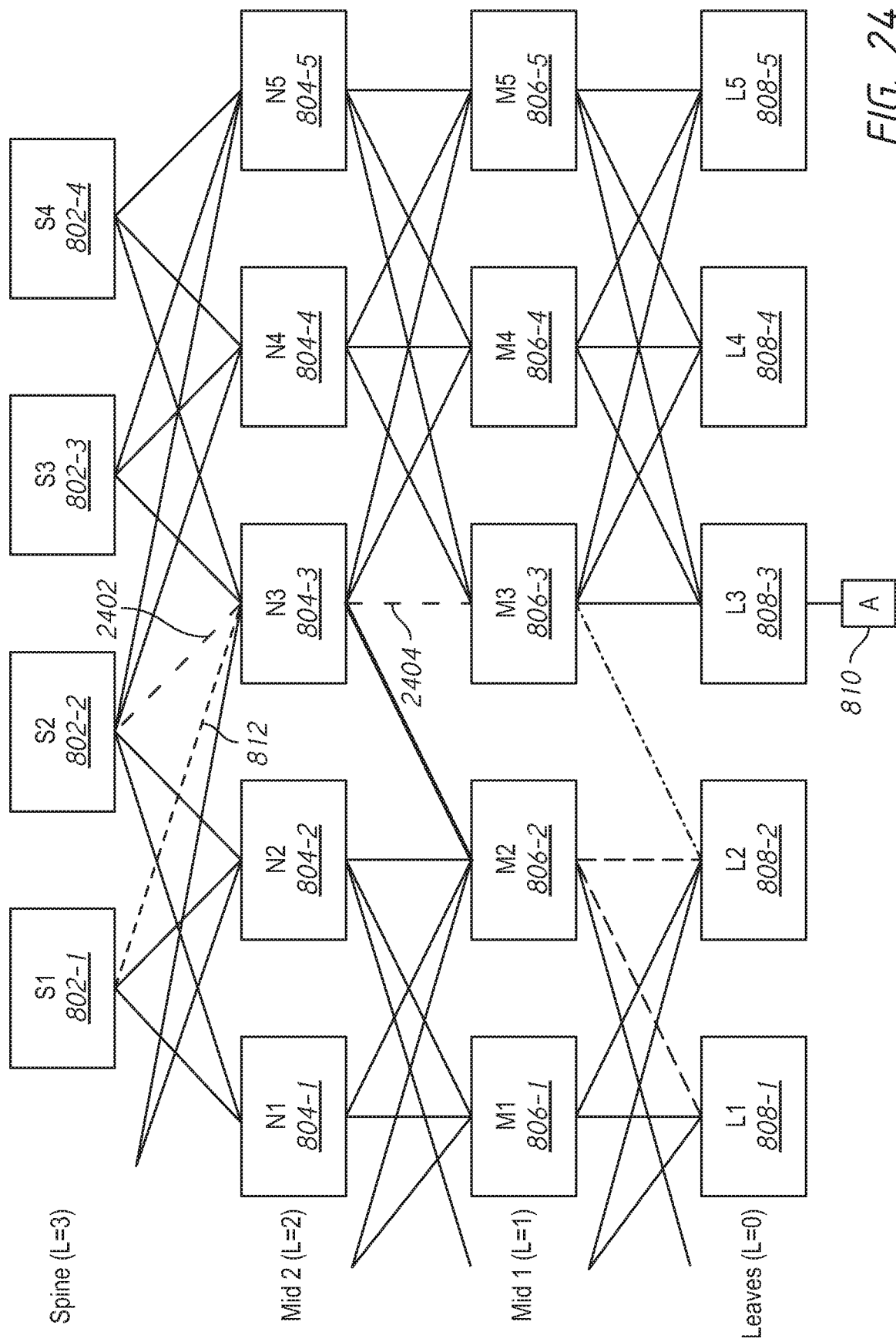
FIG. 24 is a diagram illustrating an example selection of links in the network of FIG. 8.

In some embodiments, the graph may be completed with the minimum tree down the spine node 802 that encompasses the selected links. For example, FIG. 24 illustrates example links that may be added. A link 2402 connecting the spine node 802-2 and the mid-level node 804-3 and a link 2404 connecting the mid-level node 804-3 and the mid-level node 806-3 may be added to complete a distribution tree.

Figure 25:
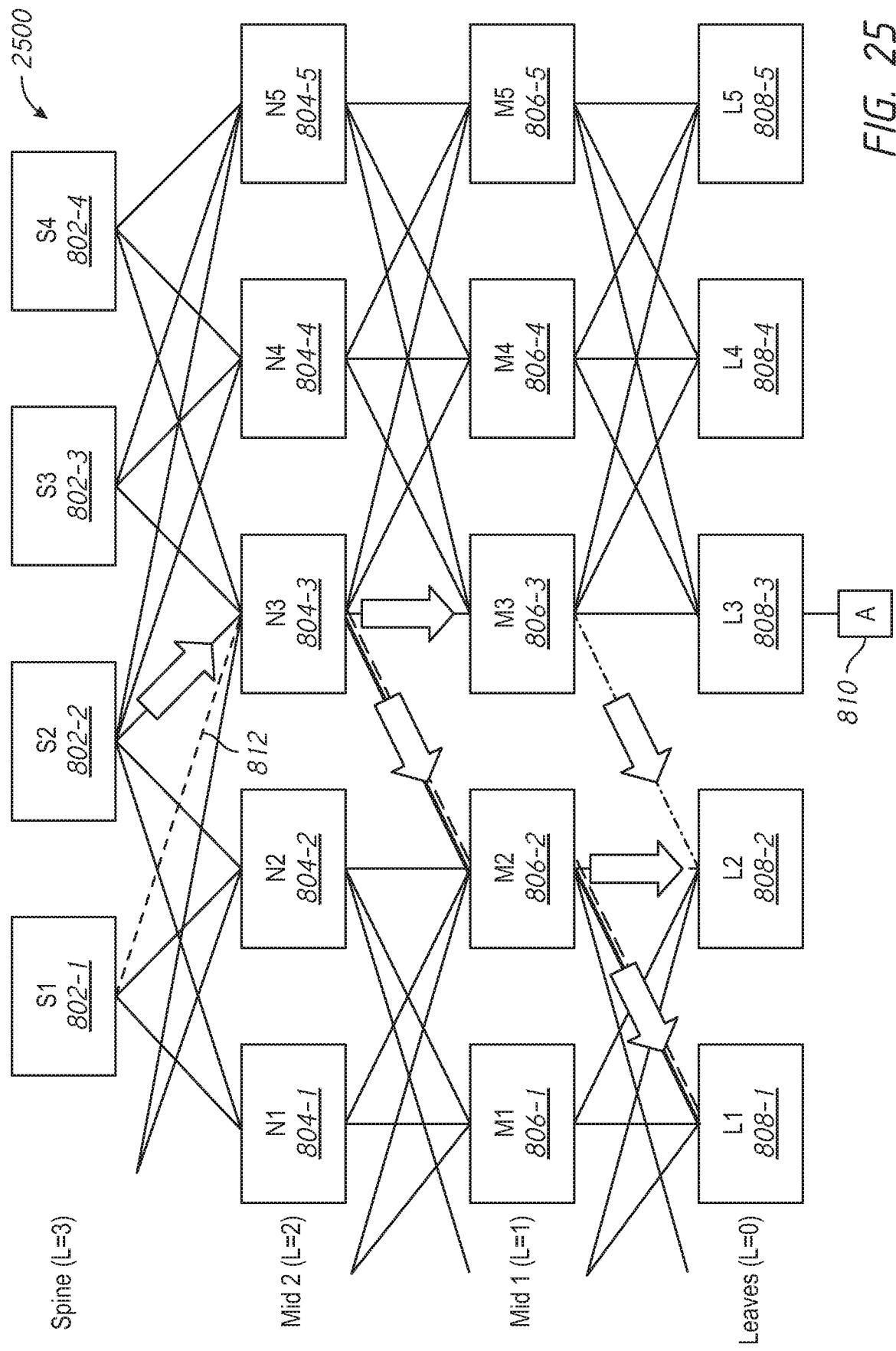
FIG. 25 illustrates an example disaggregation advertisement graph.

In some embodiments, source routing information may be used in an advertisement along a subtree. Data packets may be routed normally, e.g., without modification. FIG. 25 illustrates an example disaggregation advertisement graph 2500. In the example shown in FIG. 25, a portion (e.g., an option) of a distance vector (DV) disaggregation advertisement that is sent down may indicate a set of nodes in a tree. This set of nodes may be used as a filter. A node may send down the disaggregated advertisement only to south adjacencies that are listed in the portion of the DV disaggregation advertisement. For example, in the example shown in FIG. 25, the spine node 802-2 may send the disaggregation advertisement only to the mid-level node 804-3, the mid-level nodes 806-2 and 806-3, and the leaf nodes 808-1, 808-2, and 808-3. This technique may be considered a filtering technique in which the subtree is signaled in a message that may include the topology information element (TIE) that may propagate the disaggregated route southbound to install the disaggregated route to the nodes of the subtree. This signaling may result in filtering the southbound advertisement such that it is only performed along the subtree. This technique may be complex in the control plane but can operate with simple switches without the need to support any source routing. From the perspective of the spine node 802-2, this filtered advertisement may provide the required coverage of the leaves that need disaggregation with minimal control plane operation.

Figure 26:
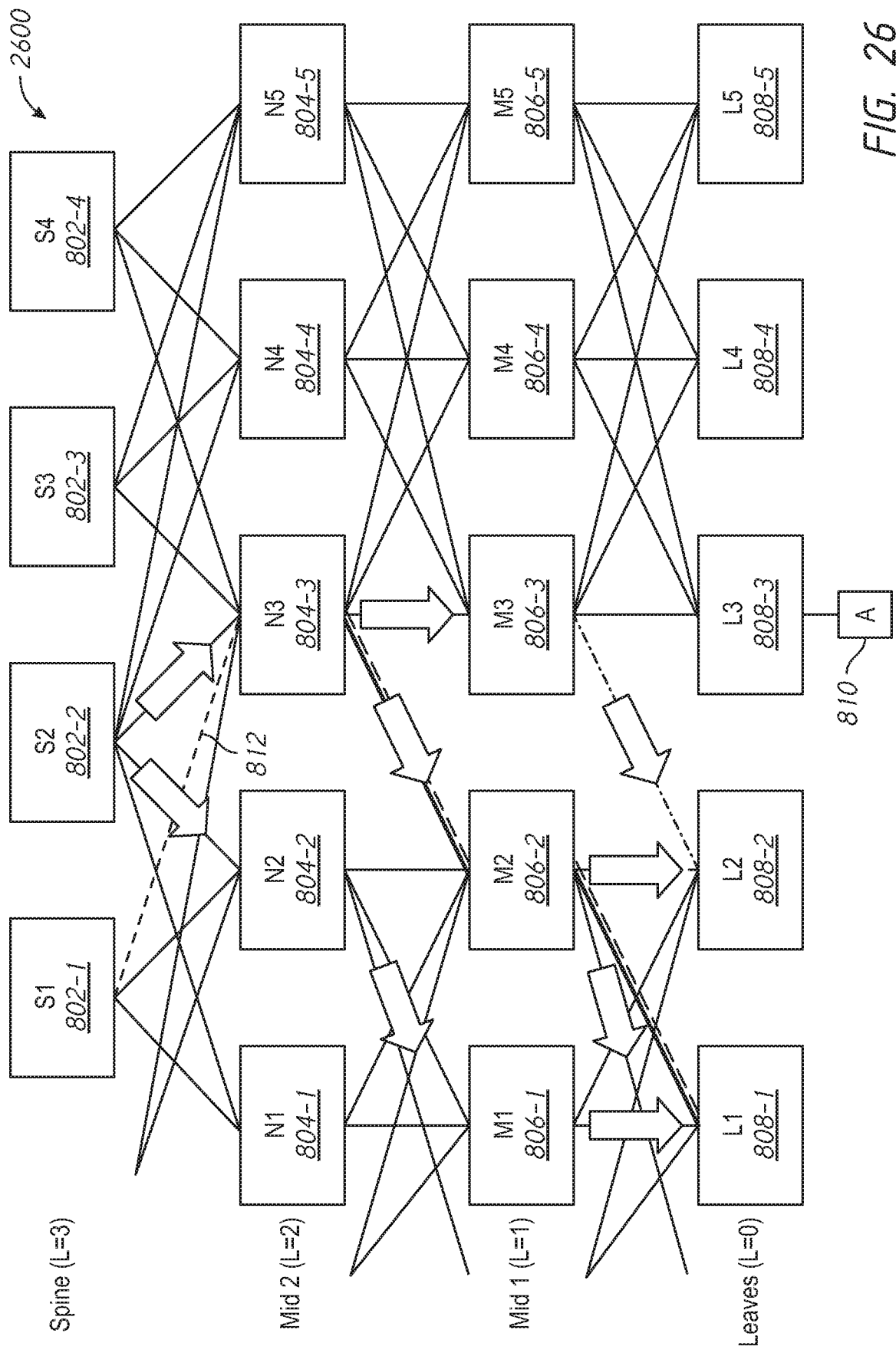
FIG. 26 illustrates an example advertisement graph.

FIG. 26 illustrates an example advertisement graph 2600 that may be created by setting K to a value of K=4 to K=6, resulting in full diversity. For example, in the advertisement graph 2600, the spine node 802-2 may send the disaggregation advertisement to the mid-level node 804-2 and the mid-level node 806-1, in addition to the nodes in the advertisement graph 2500 of FIG. 25.

In some embodiments, a similar message with the same option may be sent over the same path as the disaggregation advertisement to remove the disaggregated route. The disaggregated route may be removed, for example, only when all of the spine nodes that had previously advertised the disaggregated route have sent a message to remove the disaggregated route.

Figure 27:
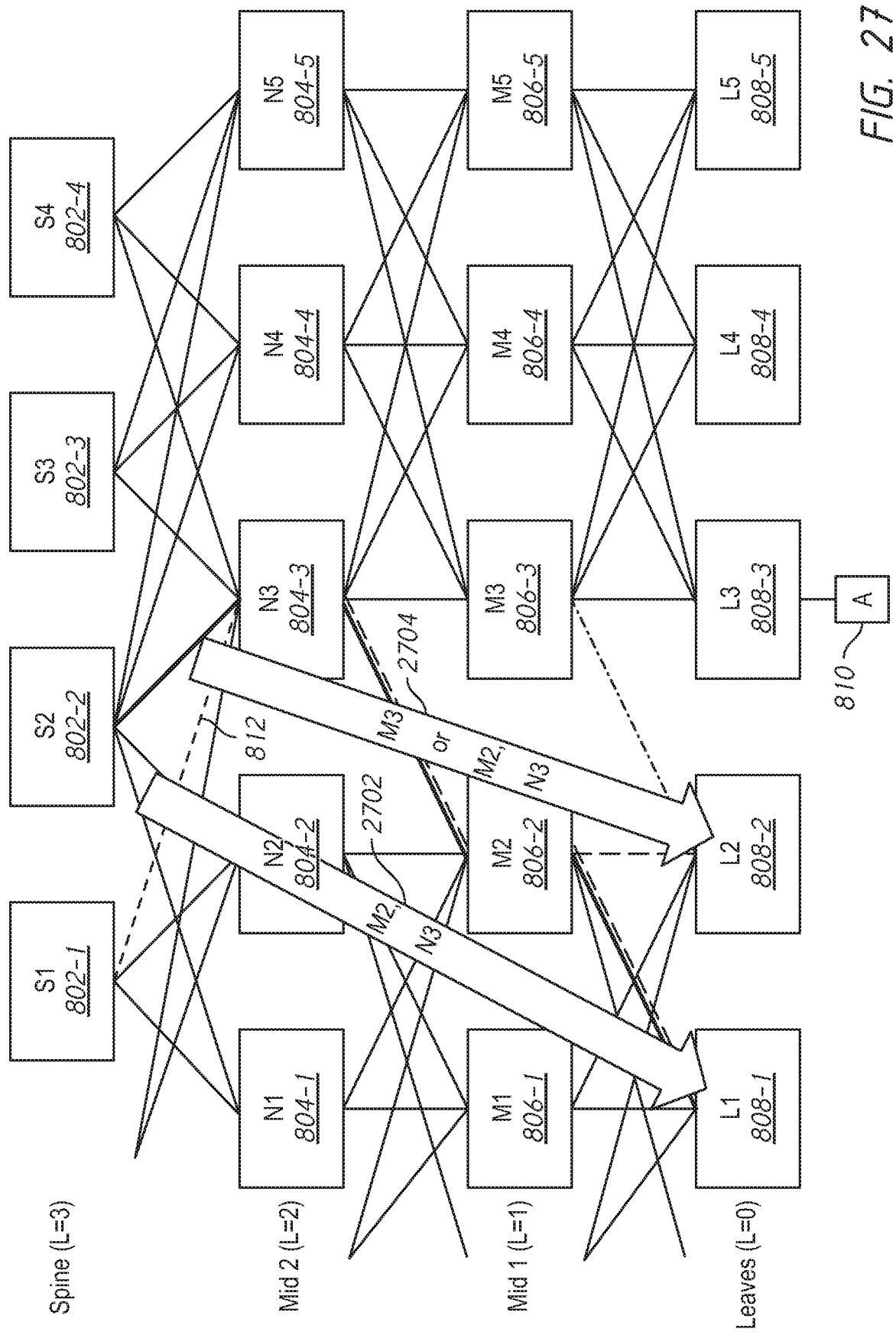
FIG. 27 illustrates an example of sending unicast control messages directly to individual leaf nodes.

In some embodiments, the spine (e.g., one or more spine nodes) may send unicast control messages directly to individual leaf nodes. FIG. 27 illustrates an example of this technique. In the example shown in FIG. 27, the spine node 802-2 may send a control message that may indicate a source route path (e.g., a segment routing source route path) that may lead to a destination where the packet can be normally routed. That source route path may be placed in every packet to the prefix 810. In this example, a source route path 2702 may go from the spine node 802-2 to the leaf node 808-1 via the mid-level node 804-3 and the mid-level node 806-2. Another source route path 2704 may go from the spine node 802-2 to the leaf node 808-2 via the mid-level node 804-3 and either the mid-level node 806-2 or the mid-level node 806-3. Segment routing may be used to steer traffic from the leaf node toward a disaggregating switch over at least two non-congruent paths. This may involve support of segment routing from L3 switches in the fabric.

Figure 28:
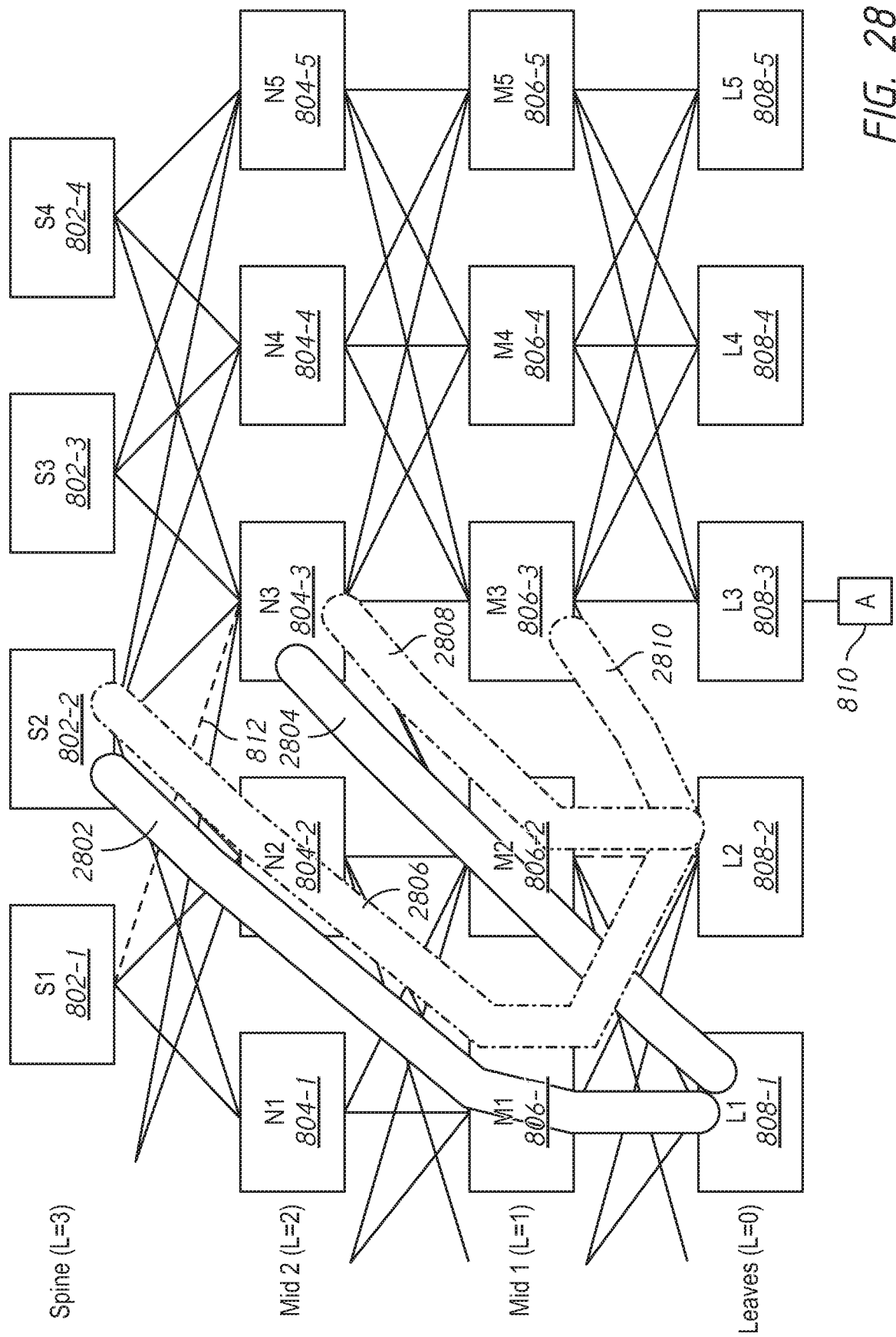
FIG. 28 illustrates example tunnels that may be configured in the network of FIG. 8.

In some embodiments, an advertisement protocol may be distance vector (DV) hop-by-hop. A state, e.g., state information, may be installed at each hop. The spine (e.g., one or more spine nodes) may install state information along the path of a packet from an ingress leaf node to an egress leaf node to funnel an overlay (e.g., as opposed to an underlay). On the overlay level, packets may be tunneled leaf-to-leaf (e.g., using technology such as virtual extensible local area network (VxLAN). A tunnel at each hop (e.g., by the source and destination using source address dependent routing) may be matched to a collection of feasible successors installed by the spine nodes. FIG. 28 illustrates some example tunnels 2802, 2804, 2806, 2808, and 2810. Source/destination (S/D) routing may be used. S/D routing is being introduced in some environments related to, for example, multi-homing. This technique may avoid source routing but may involve more complex forwarding and may be implemented in situations where the fabric is connected to multihomed routers to reach the internet.

Figure 29:
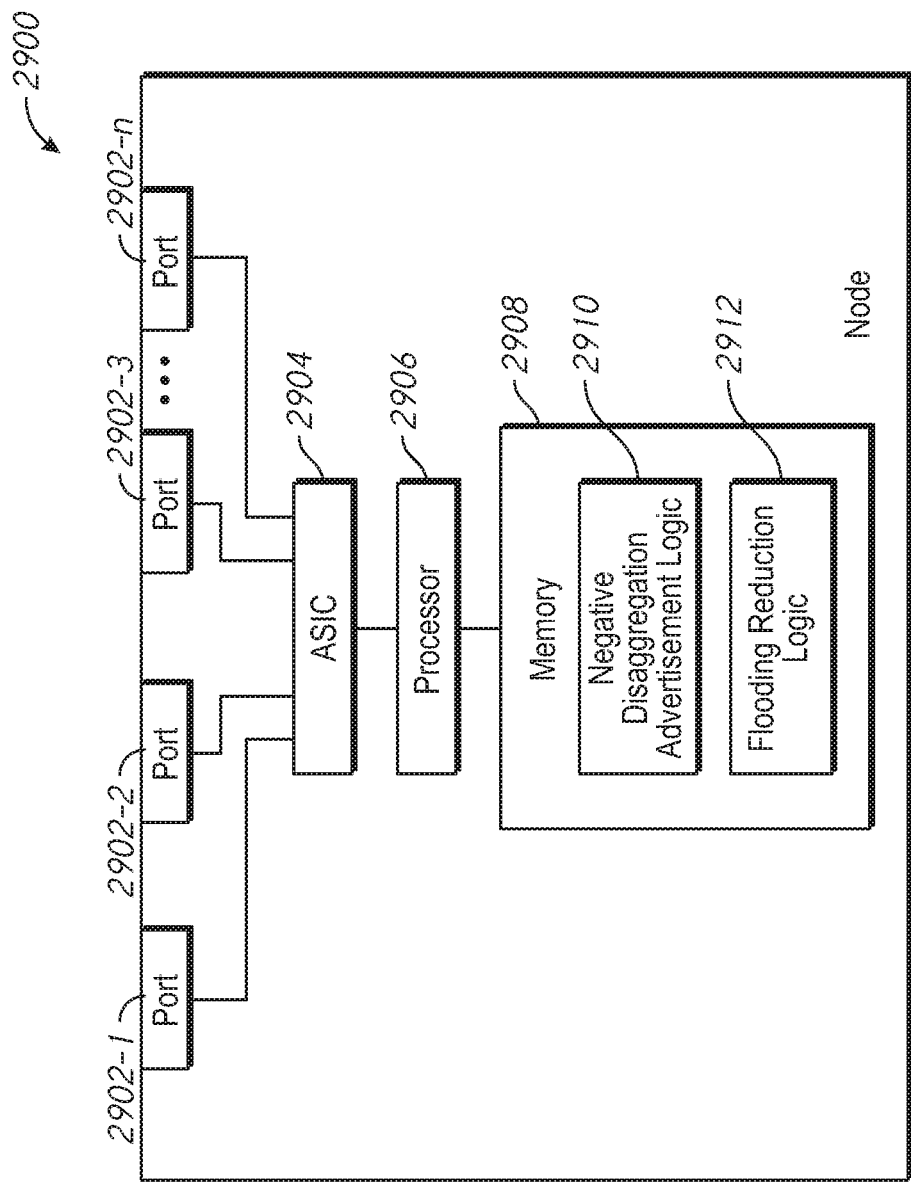
FIG. 29 is a block diagram of an example network node.

FIG. 29 is a block diagram illustrating an example network node 2900, which may be implemented, for example, as a router, switch, or the like. The network node 2900 may be configured to implement the techniques disclosed herein. The network node 2900 may include a network interface in the form of a plurality of network ports 2902-1, 2902-2, 2902-3, . . . , 2902-*n*, that may enable communications over a network, an application-specific integrated circuit (ASIC) 2904 that may perform network processing functions, one or more processors (e.g., microprocessors or microcontrollers) 2906, and a memory 2908 including negative disaggregation advertisement logic 2910 and flooding reduction logic 2912.

Figure 30:
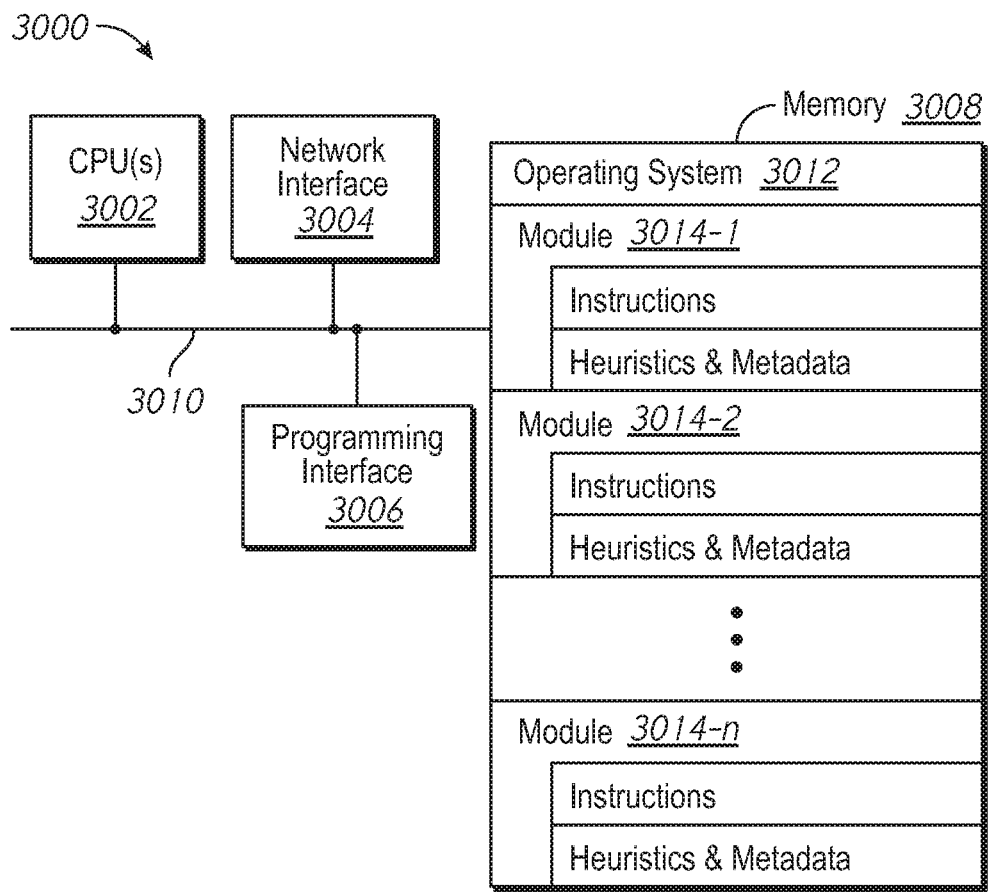
FIG. 30 is a block diagram of an example server system.

FIG. 30 is a block diagram of an example server system 3000 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 3000 may include one or more processing units (CPUs) 3002, a network interface 3004, a programming interface 3006, a memory 3008, and one or more communication buses 3010 for interconnecting these and various other components.

The network interface 3004 may be provided to, among other uses, establish and/or maintain a metadata tunnel between a cloud-hosted network management system and at least one private network including one or more compliant devices. In some embodiments, the one or more communication buses 3010 may include circuitry that interconnects and controls communications between system components. The memory 3008 may include one or more of high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. The memory 3008 may include one or more storage devices remotely located from the one or more CPUs 3002. The memory 3008 may comprise a non-transitory computer readable storage medium.

In some embodiments, the memory 3008 or the non-transitory computer readable storage medium of the memory 3008 may include (e.g., store) the following programs, modules, and data structures, or a subset thereof including one or more of an operating system 3012 or various modules 3014-1, 3014-2, . . . , 3014-*n*. The modules 3014-1, 3014-2, . . . , 3014-*n*, individually and/or collectively, perform one or more of the operations described herein. To that end, in various embodiments, the modules 3014-1, 3014-2, . . . , 3014-*n* may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the second node are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   determining, at a spine node in communication with a network, a disaggregated route to a first leaf node of the network, wherein a disaggregated prefix is attached to the first leaf node;
   propagating a packet comprising information relating to the disaggregated route from an ingress leaf node of a tunnel to an egress leaf node of the tunnel; and
   installing a state at a node along a path from the ingress leaf node to the egress leaf node; and
   determining, at the spine node in communication with the network, a subtree of a shadow cone of the spine node, the subtree comprising a plurality of nodes and a plurality of links connecting pairs of the plurality of the nodes wherein determining the subtree of the shadow cone of the spine node comprises determining the subtree of the shadow cone, wherein the shadow cone comprising the set of nodes that the spine node can flood with the recursive disaggregation, and wherein a northern boundary of the shadow cone demarcates an extent of the set of nodes the spine node has awareness of.

2. The method of claim 1, wherein installing the state at the node along the path from the ingress leaf node to the egress leaf node comprises installing, by the spine node, the state at the node along the path from the ingress leaf node to the egress leaf node.

3. The method of claim 1, further comprising:
   tunneling packets leaf-to-leaf on an overlay level.

4. The method of claim 3, wherein tunneling the packets leaf-to-leaf on the overlay level comprises tunneling the packets leaf-to-leaf on the overlay level though a virtual extensible local area network (VxLAN).

5. The method of claim 3, wherein tunneling the packets leaf-to-leaf on the overlay level comprises matching a tunnel at each hop to a plurality of feasible successors installed by the spine node.

6. The method of claim 3, wherein tunneling the packets leaf-to-leaf on the overlay level comprises tunneling the packets leaf-to-leaf on the overlay level through source/destination (S/D) routing.

7. The method of claim 1, wherein installing the state at the node along the path from the ingress leaf node to the egress leaf node comprises installing the state at the node along the path from the ingress leaf node to the egress leaf node to tunnel an overlay.

8. A device comprising:
   a memory device; and
   a processor connected to the memory device, wherein the processor is configured to:
      determine, at the device in communication with a network, a disaggregated route to a first leaf node of the network, wherein a disaggregated prefix is attached to the first leaf node;
      propagating a packet comprising information relating to the disaggregated route from an ingress leaf node of a tunnel to an egress leaf node of the tunnel;
      installing a state at a node along a path from the ingress leaf node to the egress leaf node; and
      determining, at the device in communication with the network, a subtree of a shadow cone of the spine node, the subtree comprising a plurality of nodes and a plurality of links connecting pairs of the plurality of the nodes wherein determining the subtree of the shadow cone of the spine node comprises determining the subtree of the shadow cone, wherein the shadow cone comprising the set of nodes that the spine node can flood with the recursive disaggregation, and wherein a northern boundary of the shadow cone demarcates an extent of the set of nodes the spine node has awareness of.

9. The device of claim 8, wherein the processor is further configured to:
   tunnel packets leaf-to-leaf on an overlay level.

10. The device of claim 9, wherein the processor being operative to tunnel the packets leaf-to-leaf on the overlay level comprises the processor being configured to tunnel the packets leaf-to-leaf on the overlay level though a virtual extensible local area network (VxLAN).

11. The device of claim 9, wherein the processor being configured to tunnel the packets leaf-to-leaf on the overlay level comprises the processor being operative to match a tunnel at each hop to a plurality of feasible successors installed by the spine node.

12. The device of claim 9, wherein the processor being operative to tunnel the packets leaf-to-leaf on the overlay level comprises the processor being operative to tunnel the packets leaf-to-leaf on the overlay level through source/destination (S/D) routing.

13. A non-transitory computer readable storage medium storing instructions, which, when executed by a processor performs a method comprising:
   determining, at a spine node in communication with a network, a disaggregated route to a first leaf node of the network, wherein a disaggregated prefix is attached to the first leaf node;
   propagating a packet comprising information relating to the disaggregated route from an ingress leaf node of a tunnel to an egress leaf node of the tunnel;
   installing a state at a node along a path from the ingress leaf node to the egress leaf node; and
   determining, at the spine node in communication with the network, a subtree of a shadow cone of the spine node, the subtree comprising a plurality of nodes and a plurality of links connecting pairs of the plurality of the nodes wherein determining the subtree of the shadow cone of the spine node comprises determining the subtree of the shadow cone, wherein the shadow cone comprising the set of nodes that the spine node can flood with the recursive disaggregation, and wherein a northern boundary of the shadow cone demarcates an extent of the set of nodes the spine node has awareness of.

14. The non-transitory computer readable medium of claim 13, wherein installing the state at the node along the path from the ingress leaf node to the egress leaf node comprises installing, by the spine node, the state at the node along the path from the ingress leaf node to the egress leaf node.

15. The non-transitory computer readable medium of claim 13, further comprising tunneling packets leaf-to-leaf on an overlay level though a virtual extensible local area network (VxLAN).

* * * * *